(12) United States Patent  (10) Patent No.: US 7,142,512 B1
Kobayashi et al.  (45) Date of Patent: Nov. 28, 2006

(54) NETWORK MEASUREMENT CONTROLLING SYSTEM APPARATUS AND METHOD

(75) Inventors: Emiko Kobayashi, Kawasaki (JP); Tomoichi Ebata, Sagamihara (JP); Minoru Koizumi, Yokohama (JP); Chiho Kitahara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/571,003

(22) Filed: May 15, 2000

(30) Foreign Application Priority Data

Dec. 2, 1999  (JP)  ............................... P11-342949

(51) Int. Cl.
*H04J 1/16* (2006.01)
*H04J 3/14* (2006.01)
(52) U.S. Cl. .................. 370/232; 370/235; 370/237; 370/252; 370/428; 709/203
(58) Field of Classification Search ........ 370/224–235, 370/395.21, 428.25, 252–253, 473, 237, 370/359.21, 428, 395.2, 230.1; 709/104, 709/203, 224, 226, 225, 249, 223
See application file for complete search history.

(56) References Cited

U.S. PATENT DOCUMENTS 5,408,465 A * 4/1995 Gusella et al. .............. 370/231
5,455,820 A * 10/1995 Yamada ................. 370/395.71
5,566,175 A * 10/1996 Davis ......................... 370/468

(Continued)

FOREIGN PATENT DOCUMENTS

EP  0786883 A  7/1997

(Continued)

OTHER PUBLICATIONS

Gerla et al. "Network management using database discovery tools," IEEE Computer Society Proceedings of 16th Conference On Local Computer Networks, Minneapolis, MN, USA, pp. 378-385 (1991).

(Continued)

*Primary Examiner*—John Pezzlo
*Assistant Examiner*—Inder Pal Mehra
(74) *Attorney, Agent, or Firm*—Townsend and Townsend and Crew LLP

(57) ABSTRACT

According to the invention, techniques for controlling the quality of each communication service in a network automatically according to measured information of network traffic are provided. In a representative embodiment, a network measurement controlling system is provided according to the present invention, which comprises a control server, a router, and a meter connected to a network. The meter receives packets from a network and measures the number of packets, and the like, according to preset measurement rules, and transfers measured data to a control server. The control server holds control rules including its control policy for assuring the quality of each communication service, analyzes measured data transferred from the meter, and transmits control commands. The router controls the QoS automatically in real time according to the status of the network by receiving control commands and controlling communication service quality.

21 Claims, 19 Drawing Sheets

U.S. PATENT DOCUMENTS

| | | | |
|---|---|---|---|
| 5,802,278 A * | 9/1998 | Isfeld et al. | 709/249 |
| 5,936,940 A * | 8/1999 | Marin et al. | 370/232 |
| 5,958,009 A | 9/1999 | Friedrich et al. | |
| 6,483,805 B1 * | 11/2002 | Davies et al. | 370/235 |
| 6,519,636 B1 * | 2/2003 | Engel et al. | 709/223 |
| 6,590,869 B1 * | 7/2003 | Beyda et al. | 370/248 |
| 6,594,268 B1 * | 7/2003 | Aukia et al. | 370/400 |
| 6,680,948 B1 * | 1/2004 | Majd et al. | 370/401 |
| 6,747,981 B1 * | 6/2004 | Ardalan et al. | 370/401 |
| 6,757,255 B1 * | 6/2004 | Aoki et al. | 370/252 |
| 6,765,864 B1 * | 7/2004 | Natarajan et al. | 370/224 |

FOREIGN PATENT DOCUMENTS

| | | |
|---|---|---|
| EP | 0868060 A | 9/1998 |
| JP | 11-3266 | 1/1999 |
| JP | 11-27316 | 1/1999 |
| JP | 11-136237 | 5/1999 |
| WO | WO99/11003 A1 | 3/1999 |

OTHER PUBLICATIONS

Nandy et al. "Connectionless Approach To Providing QOS In IP Networks," International Conference on High Performance Networking Sep. 21, 1998, pp. 363-379 (1998).

Tamvaclis C "QOS Driven Routing In Packet Switched Networks Of Multiple Transmission Media," AGARD Conference Proceedings, Neuilly Sur Seine, FR Oct. 4, 1993, pp. 21-28, (1993).

* cited by examiner

FIG.3

| RULE NO. | OBJECT FLOW | MEASUREMENT TYPE |
|---|---|---|
| 1 | aaa → bbb | packet byte |
| 2 | xxx, 100 ↔ yyy, 200 | packet byte, throughput |
| ⋮ | ⋮ | ⋮ |

FIG.4

| RULE NO. | MEASUREMENT RESULT | | | |
|---|---|---|---|---|
| 1 | 20 | 20,000 | — | .... |
| 2 | 10 | 10,000 | 3M | .... |
| ⋮ | ⋮ | ⋮ | | |

FIG.7 (a)

| OBJECT FLOW | DATA TYPE | UPPER LIMIT | LOWER LIMIT | MEASURED VALUE | CURRENT SET VALUE | Policy | OBJECT COMPONENT | |
|---|---|---|---|---|---|---|---|---|
| aaa→bbb | DELAY | 20ms | 18ms | 25ms | BANDWIDTH: 2Mbps | C3→A1 (OR) C4→A3 | ROUTER 1 | 711 |
| ccc→bbb | THROU-GHPUT | 3Mbps | 2.5Mbps | 3Mbps | BANDWIDTH: 3Mbps | C1→A1 (OR) C2→A3 | ROUTER 1 | 712 |
| fff→bbb | DELAY | 10ms | 9ms | 11ms | BANDWIDTH: 3Mbps | C1 AND C3 →A1(OR) C2 AND C4 →A3 | ROUTER 1 | 713 |
| | THROU-GHPUT | 3Mbps | 2.8Mbps | 2.7Mbps | | | | |
| ccc→ddd | THROU-GHPUT | 2Mbps | 1.5Mbps | 1.4Mbps | PRIORITY 1 | C1→A2 (OR) C2→A4 | ROUTER 2 | 714 |
| eee→ddd | DELAY | 5ms | 3ms | 6ms | PRIORITY 2 | C3→A2 (OR) C4→A4 | ROUTER 2 | 715 |
| xxx→yyy | DELAY | 10ms | 9ms | 11ms | ROUTE R1 | C3→A5 | ROUTER 3 | 716 |
| ⋮ | | | | ⋮ | | | | |

| | CONDITION | | ACTION |
|---|---|---|---|
| C1 | THROUGHPUT<LOWER LIMIT | A1 | BANDWIDTH UPDATED TO CURRENT VALUE + 0.5 |
| C2 | THROUGHPUT>UPPER LIMIT | A2 | PRIORITY UPDATED TO CURRENT VALUE -1 |
| C3 | DELAY>UPPER LIMIT | A3 | BANDWIDTH UPDATED TO CURRENT VALUE - 0.5 |
| C4 | DELAY<LOWER LIMIT | A4 | PRIORITY UPDATED TO CURRENT VALUE +1 |
| | ⋮ | A5 | CHANGED TO ALTERNATIVE ROUTE |
| | | | ⋮ |

1402

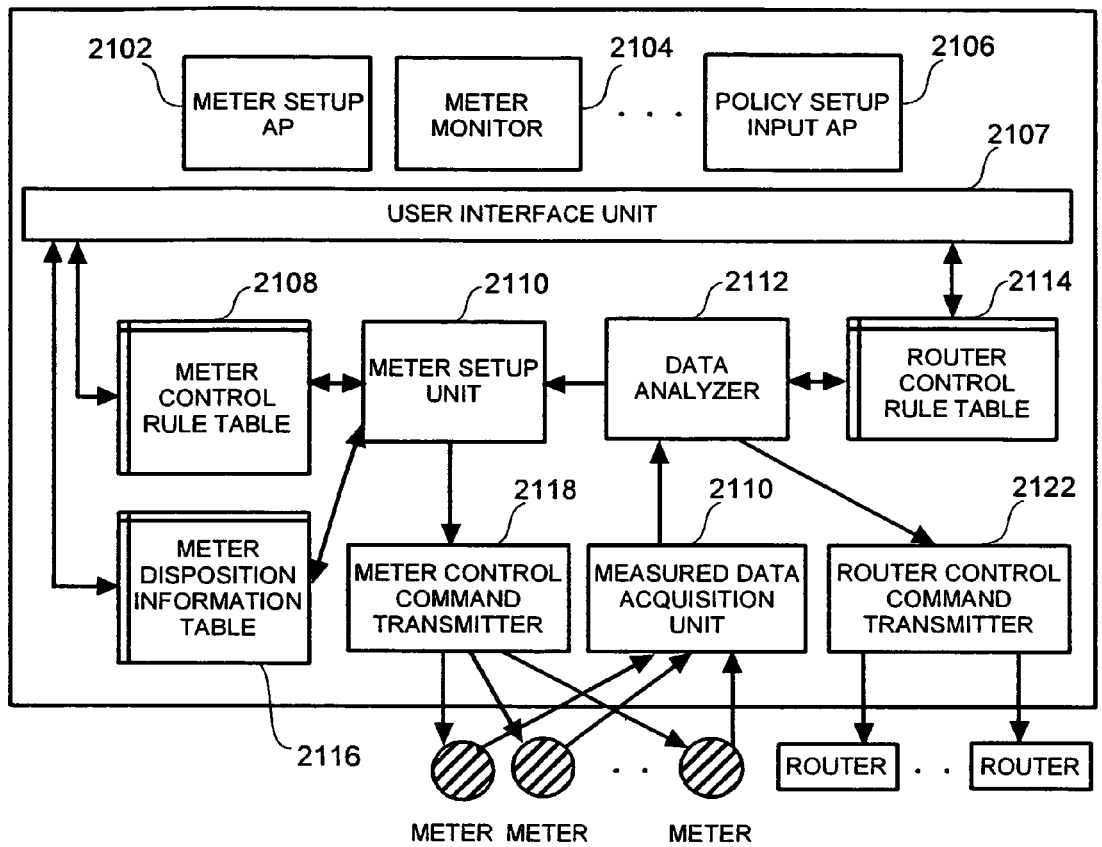

FIG.20

| METER ID (21080) | A/N (21088) | OBJECT FLOW (21081) | DATA TYPE (21082) | DEPAR- TURE/ ARRIVAL (21083) | MEASURE- MENT INTERVAL(S) (21084) | MEASUREMENT REFERENCE TIME (21085) | MEASUR- ING TIME (S) (21086) | BASIC DELAY TIME(ms) (21087) |
|---|---|---|---|---|---|---|---|---|
| 1 | A | aaa → bbb | DELAY | DEPARTURE | 180 | 1999/12/24 12:23:34 | 10 | - |
| 1 | A | * → aaa | THROUGH- PUT | ARRIVAL | 0 | 1999/12/21 05:45:21 | - | - |
| 1 | N | ccc → aaa | DELAY | ARRIVAL | 300 | 1999/10/10 00:01:01 | 20 | 423±15 |
| 2 | N | aaa → bbb | DELAY | ARRIVAL | 180 | 1999/12/21 05:45:21 | 20 | 500±20 |

| RULE NO. | A/N | OBJECT FLOW | DATA TYPE | DEPAR- TURE/ ARRIVAL | MEASURE- MENT INTERVAL(S) | MEASUREMENT REFERENCE TIME | MEASUR- ING TIME (S) | BASIC DELAY TIME(ms) |
|---|---|---|---|---|---|---|---|---|
| 1 | A | aaa → bbb | DELAY | DEPARTURE | 180 | 1999/12/24 12:23:34 | 10 | - |
| 2 | A | * → aaa | THROUGH- PUT | ARRIVAL | 0 | 1999/12/21 05:45:21 | - | - |
| 3 | N | ccc → aaa | DELAY | ARRIVAL | 300 | 1999/10/10 00:01:01 | 20 | 423±15 |

FIG.22

| RULE NO. (21801) | START ADDRESS OF MEASUREMENT RESULT (21803) | DATA STORING FORMAT (21802) | DATA Q'TY (21804) |
|---|---|---|---|
| 1 | XX | IP HEADER ONLY | 1 |
| 2 | YY | FULL PACKET | 0 |
| 3 | ZZ | IP HEADER +8 BYTES | 20 |

NETWORK MEASUREMENT CONTROLLING SYSTEM APPARATUS AND METHOD

CROSS-REFERENCES TO RELATED APPLICATIONS

This application claims priority from Japanese Patent Application Reference No. 11-342949, filed Dec. 2, 1999, the entire content of which is incorporated herein by reference for all purposes.

BACKGROUND OF THE INVENTION

The present invention relates generally to network measurement and control, and specifically to techniques that measure a packet traffic using a device operable in a network and controlling the network traffic based upon the measurement so as to assure required communication service quality.

The internet protocol is a best effort type protocol. As such, the protocol typically does not monitor missing of packets. Thus, it does not usually transmit the same packets again; rather it transmits packets to their addresses. In addition, the internet protocol typically does not assure the quality of any communication service. Therefore, an QoS (QoS: Quality of Service) controlling technique is used to assure the necessary quality of each communication service if the Internet and/or an intranet are shared among various application programs such as host communications and voice communications, and the like.

There are various types of the QoS controlling techniques. For example, a technique for operating transfer priorities of frames and packets on each network component level, a technique for controlling quality of communications among application programs on user terminals, such as controlling of TCP flows, data compression, and the like.

What is really needed are techniques for controlling network information flow based upon a specified quality of service.

SUMMARY OF THE INVENTION

According to the invention, techniques for controlling the quality of each communication service in a network automatically according to measured information of network traffic are provided. Embodiments can comprise systems, servers, methods and computer programs that can manage network resources in order to provide quality of service for one or more packet flows.

In a representative embodiment, a network measurement controlling system is provided according to the present invention. The network measurement controlling system can comprise a control server, a router, and a meter connected to a network. The meter receives packets from a network and measures a flow by determining a number of packets, and the like, according to preset measurement rules, and transfers measured data to a control server. The control server comprises control rules including its control policy for assuring the quality of each communication service. The control server can analyze measured data transferred from the meter, and can provide as output commands for controlling communication quality of service (QoS). The router controls the QoS automatically in real time according to the status of the network by receiving control commands and controlling communication service quality.

In a specific embodiment, the meter, when receiving a target packet, gives the receiving time information to the packet, transfers part or the whole of the packet to a server. The server receives such packets provided with the time information respectively from at least two meters and compares the contents of those packets with each other, thereby confirming the identity of each of the packets and measure a time (delay time) required until the packet passes the network.

In another representative embodiment according to the present invention, methods for enforcing a quality of service one or more flows in a network are provided. The method can comprise a variety of steps, such as a step of receiving information indicating a desired quality of service, for example. A step of dynamically monitoring the network at a first point for packets in the flows in order to determine a measured quality of service can also be part of the method. Further, the method can include a step of comparing the measured quality of service to the information indicating a desired quality of service, and thereupon dynamically reallocating network resources to manage the flows in order to maintain the desired quality of service.

In a specific embodiment, the present invention can provide a method having steps of dynamically monitoring the network at a second point for packets in the flows. A step of computing, based upon information from monitoring the network at the first point and information from monitoring the network at the second point, a measured value of quality of service. Further, a step of comparing the measured value of quality of service with the information indicating a desired quality of service; and thereupon dynamically reallocating network resources to manage the flows in order to maintain the desired quality of service can also be included in the method.

In a further representative embodiment according to the present invention, a server connected to a network is provided. The server can comprise a storage device that stores a measured value of delay for a measurement flow, an upper limit value and a lower limit value for said measured value. Further a controller for instructing a router to widen a bandwidth if said measured value of delay exceeds said upper limit value, and for instructing the router to narrow the bandwidth if the measured value of delay drops below the lower limit value can also be included in the server. In an alternative embodiment, the controller can instruct a router to raise priority if the measured value of delay exceeds the upper limit value, and can instruct the router to lower the priority if the measured value of delay drops below the lower limit value.

In other alternative embodiments, the server can instruct a router to control bandwidth allocation, or flow priority, based upon a measured value of throughput. The server can instruct the router to narrow bandwidth, or lower priority, if the measured value of throughput exceeds an upper limit value, and the server can instruct the router to widen bandwidth, or raise priority, if the measured value of throughput drops below a lower limit value.

In a still further representative embodiment according to the present invention, a router connected to a network is provided. The router can comprise a network interface for receiving an instruction for controlling communication quality of service for a flow in said network. The instruction can be based upon a measured value of delay for the flow, an upper limit value and a lower limit value for the measured value of delay, for example. The router further comprises a queue connected to the network, the queue for allocating bandwidth. Responsive to the instruction, the router can allocate bandwidth using the queue based upon the instruction, if the measured value of delay exceeds the upper limit value, and the router can de-allocate bandwidth using the queue based upon the instruction, if the measured value of delay drops below the lower limit value. In an alternative embodiment, the router can raise priority using the queue based upon the instruction, if the measured value of delay exceeds the upper limit value, and the router can lower priority using the queue based upon the instruction, if the measured value of delay drops below the lower limit value.

In other alternative embodiments, the router can control bandwidth allocation, or flow priority, based upon a measured value of throughput. The router can de-allocate bandwidth, or lower priority, if the measured value of throughput exceeds an upper limit value, and the router can allocate bandwidth, or raise priority, if the measured value of throughput drops below a lower limit value.

Numerous benefits are achieved by way of the present invention over conventional techniques. The present invention can provide a network measurement controlling system that can control the quality of each communication service automatically according to measured information of network traffic. Specific embodiments can assure the quality of the communication service more accurately. Furthermore, specific embodiments according to the present invention can provide a network measurement controlling system that can decide accurately whether the object network guarantees a user's requested quality by measuring a flow of packets generated by the user himself/herself.

These and other benefits are described throughout the present specification. A further understanding of the nature and advantages of the invention herein may be realized by reference to the remaining portions of the specification and the attached drawings.

BRIEF DESCRIPTION OF THE DRAWINGS

FIG. 3 illustrates a representative measurement rule table of a meter in a particular embodiment according to the present invention;

FIG. 4 illustrates a representative measured data table of the meter in a particular embodiment according to the present invention;

FIG. 7 illustrates a representative control rule table in a particular embodiment according to the present invention;

FIG. 18 illustrates a functional block diagram of a control server in a particular embodiment according to the present invention;

FIG. 19 shows the contents of a meter disposition information table in a particular embodiment according to the present invention;

FIG. 20 shows the contents of a meter control rule table in a particular embodiment according to the present invention;

FIG. 21 shows the contents of a measurement rule table in a particular embodiment according to the present invention;

FIG. 22 shows the contents of a measured data table in a particular embodiment according to the present invention;

DESCRIPTION OF THE SPECIFIC EMBODIMENTS

Figure 1:
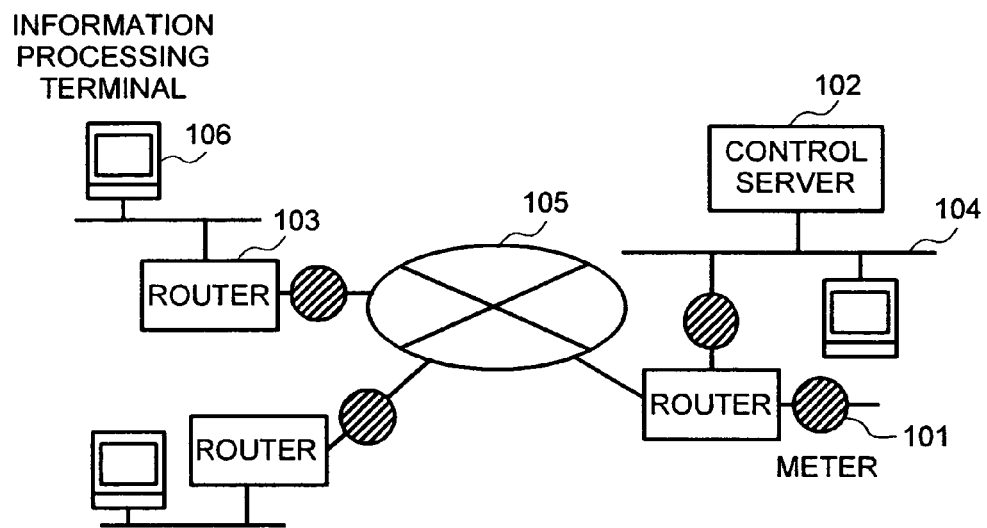
FIG. 1 illustrates a block diagram of a representative network measurement controlling system in a particular embodiment of the present invention.

The present invention provides techniques for controlling the quality of each communication service in a network automatically according to measured information of network traffic. In representative embodiments, the present invention can provide network measurement controlling systems, methods and computer programs.

In a remote monitoring technique for collecting and managing network traffic information, traffic information can be recorded in the MIB (Management Information Base), which is a standard data format for network components. Then traffic information can be obtained from the MIB using the SNMP (Simple Network Management Protocol), which is a standard network management protocol. Such a network traffic monitoring system is described in greater detail in Japanese Published Unexamined Patent Application No. 11-136237, the entire contents of which are incorporated herein by reference for all purposes. Another system for controlling data transfer with use of measured data is disclosed, for example, in Japanese Published Unexamined Patent Application No. 11-3266, the entire contents of which are incorporated herein by reference for all purposes. Furthermore, a system for controlling communication quality of each application program by monitoring the resources is described in a Japanese Published Unexamined Patent Application No. 11-27316, the entire contents of which are incorporated herein by reference for all purposes.

In particular, Japanese Published Unexamined Patent Application No. 08-009035, the entire contents of which are incorporated herein by reference for all purposes, discloses a method for measuring a transfer delay of a network. According to the method, the object network is monitored at a predetermined position and a message (REQ, ACK) is detected, from which a measured delay of the network is obtained.

Japanese Published Unexamined Patent Application No. 08-340353, the entire contents of which are incorporated herein by reference for all purposes, also discloses a technique for generating a statistical value of a packet transfer delay in a packet network. According to such techniques, both source point and a destination point are selected at random so that a measured value of a basic delay in the object network between these source and destination points can be determined. A mathematical model of the network is applied to the measured value in order to determine a statistical value of the packet transfer delay in the packet network.

Furthermore, another method for measuring a transfer delay of a network is disclosed in Japanese Published Unexamined Patent Application No. 08-009035, the entire contents of which are incorporated herein by reference for all purposes. The method applies to application programs that use a network protocol, which premises that responses are returned to messages from transmitters.

There is also a technique disclosed in Japanese Published Unexamined Patent Application No. 08-340353, the entire contents of which are incorporated herein by reference for all purposes, which can approximate how much a packet transfer is delayed in the object network with use of a mathematical model.

Figure 2:
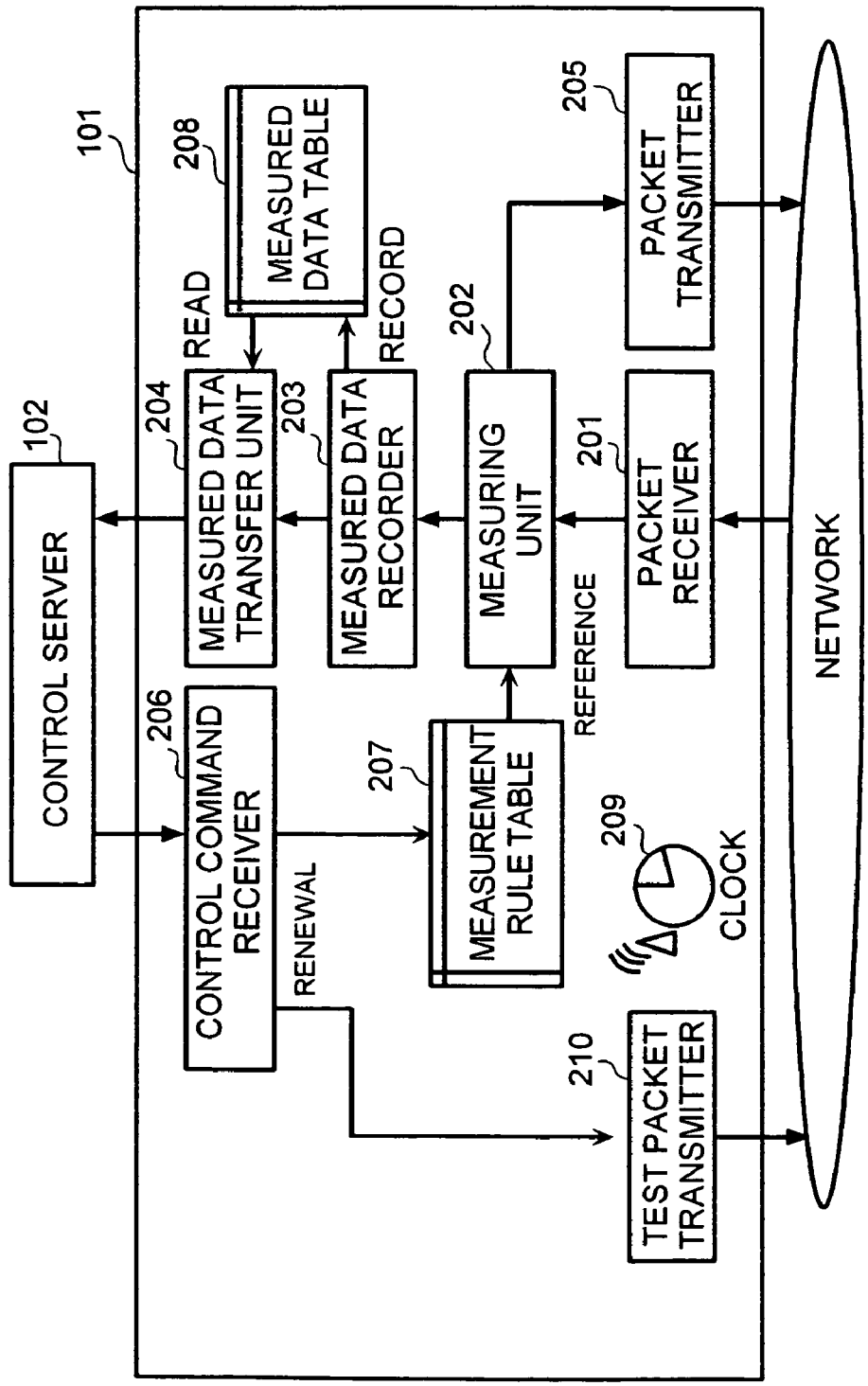
FIG. 2 illustrates a functional block diagram of a representative network measurement apparatus in a particular embodiment according to the present invention.

FIG. 1 illustrates a block diagram of a representative network measurement controlling system in a particular embodiment of the present invention. This diagram is merely an illustration and should not limit the scope of the claims herein. One of ordinary skill in the art would recognize other variations, modifications, and alternatives. One or more meters 101 and a control server 102 are connected to a LAN (Local Area Network) 104, then connected to a WAN (Wide Area Network) 105 via routers 103. The control server holds control rules. If a plurality of control servers is employed for the system, those servers will hold the same control rules respectively. Various communication services are thus supplied to each information processing terminal 106 via such a LAN or WAN. The control server is a general information supply server and has a network control function. The control server may be a server dedicated to network controlling. Hereafter, a LAN 104 and/or a WAN 105 will be referred to as a network generically FIG. 2 illustrates a functional block diagram of the meter 101 in a particular embodiment according to the present invention. This diagram is merely an illustration and should not limit the scope of the claims herein. One of ordinary skill in the art would recognize other variations, modifications, and alternatives. A packet receiver 201 receives packets flowing on the object network. As used herein, a plurality of packets classified by such header contents (address and priority information is included) as an address, for example, is referred to as a packet flow. Such a packet flow is measured in a measuring unit 202 by referencing to a measurement rule table 207, then the measurement result is recorded in a measured data table 208 under the control of the recorder 203. A transfer unit 204 then transfers recorded measured data to the control server 102. If a network is specified not to fetch packets flowing on a network, but fetch copied packets (for example, IEEE802.3) when it is receiving, the packets can be discarded after they are measured, if there is no need to transfer those packets. If a meter, which is, for example, mounted in a router, has two or more network interfaces used to fetch packets, a packet transmitter to the network transmits packets after they are measured. Furthermore, the meter can comprise a clock 209 for measuring time related data. The time can be adjusted accurately among the clocks of all the meters. The GPS (Global Positioning System) or the NTP (Network Time Protocol) can be used to adjust the time in specific embodiments.

In specific embodiments according to the present invention, a plurality of techniques can be employed by a meter to transfer measured data to a control server. One of those techniques includes transferring object data upon a request issued from a control server that keeps transmitting of acquisition requests periodically to the meter. For example, this is a case in which measured data is recorded in MIB and acquired by SNMP. In this case, the control server transmits an acquisition request to the object meter only once just before the acquisition is started. Receiving the request, the meter transfers measured data to the control server periodically. The meter then manages both transfer interval and data type for each control server. When receiving an acquisition request from a control server, the meter certifies the control server so as to prevent illegal accesses.

FIG. 3 illustrates a representative measurement rule table of a meter in a particular embodiment according to the present invention. This diagram is merely an illustration and should not limit the scope of the claims herein. One of ordinary skill in the art would recognize other variations, modifications, and alternatives. Each entry in this table comprises a rule number field 301, a measurement item flow field 302, and a measurement type field 303. The field 301 indicates a rule number assigned uniquely to each rule in a meter. The field 302 indicates a destination address (ex., "bbb") and a source address (ex., "aaa") used to identify a measurement flow. The field 303 indicates a type of such information to measure as the number of packets, a throughput, and the like. The two-way arrow between addresses in the field 302 indicates two-way communications. For example, the rule 1 shown in FIG. 3 means that the number of packets transferred from address "aaa" to address "bbb" and the number of bytes are counted. A measurement item flow is communication quality registered as an object item to measure and monitor.

FIG. 4 illustrates a representative measured data table of a meter in a particular embodiment according to the present invention. This diagram is merely an illustration and should not limit the scope of the claims herein. One of ordinary skill in the art would recognize other variations, modifications, and alternatives. Each entry in this table comprises a rule number field 401 and a measurement result field 402. The field 401 indicates a rule number given to a measurement rule and the field 402 indicates a measurement result recorded for a packet flow indicated by the number of packets, the number of bytes, a throughput, and the like, that is, communication quality elements.

Figure 5:
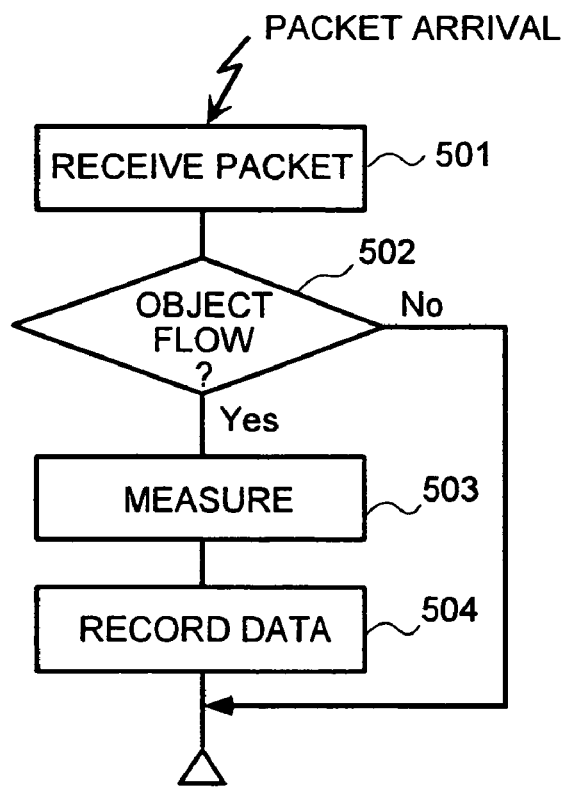
FIG. 5 illustrates a flowchart of representative operation of the meter in a particular embodiment according to the present invention.

FIG. 5 illustrates a flowchart of the representative operation of a meter in a particular embodiment according to the present invention. This diagram is merely an illustration and should not limit the scope of the claims herein. One of ordinary skill in the art would recognize other variations, modifications, and alternatives. According to this flowchart, in a step 501, a packet flow is received. Thereupon, in a step 502, it is determined whether the received packet flow is an object measurement. An object packet flow is a packet flow matching with the flow registered as shown in FIG. 3. If it is determined to be an object flow, then, in a step 503, the flow is measured according to the measurement condition. Then in step 504, the result data is recorded. Otherwise, if in step 502, it is determined that it is not an object flow, no processing is done.

Figure 6:
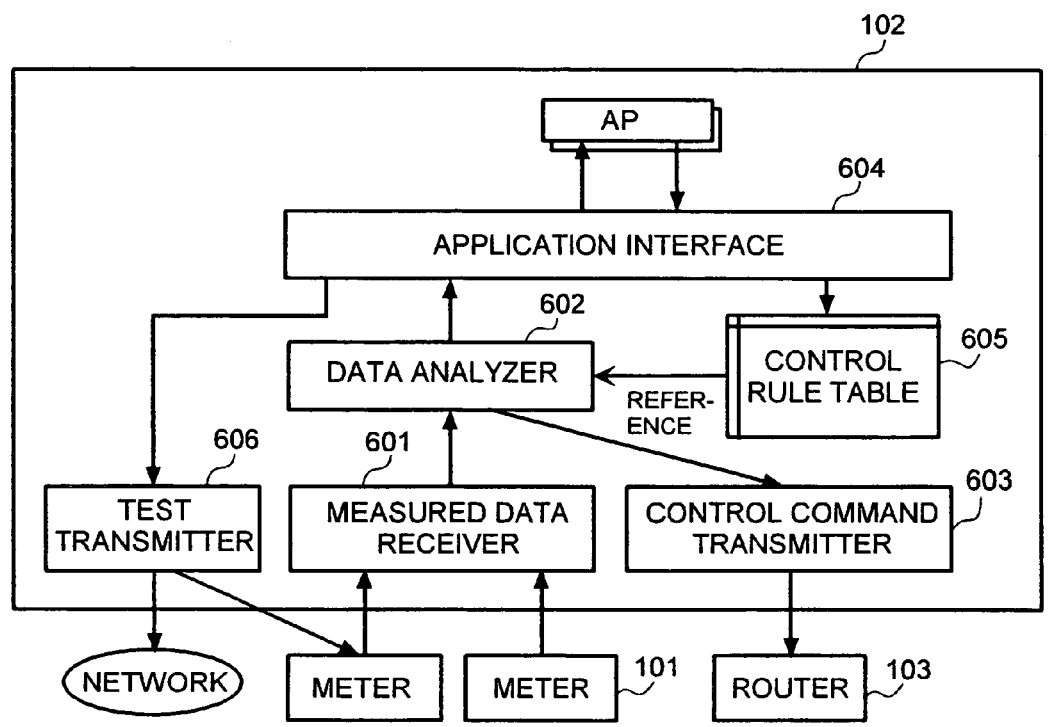
FIG. 6 illustrates a functional block diagram of a representative control server in a particular embodiment according to the present invention.

FIG. 6 illustrates a functional block diagram of a representative control server 102 in a particular embodiment according to the present invention. This diagram is merely an illustration and should not limit the scope of the claims herein. One of ordinary skill in the art would recognize other variations, modifications, and alternatives. A measured data receiver 601 receives measured data from a meter and processes the data. If the control server is specified to transmit acquisition requests to the meter periodically so as to receive data therefrom, this measured data receiver transmits those acquisition requests. A data analyzer 602 analyzes acquired data. For example, the data analyzer 602 acquires a time when each of packets in flows from two or more meters arrives and calculates the delay time. Such a delay time is also one of the communication quality elements. In addition, the data analyzer 602 decides a control method by referencing to the control rule table 605. If a communication is to be controlled, a control command transmitter 603 transmits the control command to the object router 103.

There are various measured data values. QoS elements, such as a throughput, the maximum amount of data to transfer per unit time, a delay time, a packet loss, a jitter (delay time variation), and the like. Each meter records such measured data as a packet count, a byte count, as well as such QoS related values as a throughput maximum data amount to transfer, and the like. These can be obtained by calculation. Such values are obtained by measurement at a place. In a specific embodiment, each control server collects measured data from a plurality of meters, thereby calculating such values as a delay time, a packet loss, a jitter, and the like. The control server receives contracts of communication services, service start requests, set measurement rules, display inputs, and the like, from application programs via an application interface 604.

FIG. 7(*a*) illustrates a representative control rule table in a particular embodiment according to the present invention. This diagram is merely an illustration and should not limit the scope of the claims herein. One of ordinary skill in the art would recognize other variations, modifications, and alternatives. Each entry in this table comprises an object flow field 701, a data type field 702, an upper limit value field 703, a lower limit value field 704, a measured value field 705, a current set value field 706, a policy field 707, and an object component field 708. The object flow field 701 identifies an object flow. The data type field 702 indicates a type of measured data. The upper limit value field 703 indicates an upper limit threshold for controlling communication quality with respect to a QoS related user contract. The lower limit value field 704 sets a lower limit threshold. The measured value field 705 sets a measured result. The current set value field 706 sets a currently allocated bandwidth or priority. The policy field 707 sets a control policy. The object component field 708 indicates a component to be controlled. If there are a plurality of measured data types, then a data type, an upper limit value, a lower limit value, and a measured value are provided for each of those data types.

A control policy can be indicated as a combination of a condition 709 and an action 710 as shown in FIG. 7(*b*). The condition is a condition on which controlling is done and the action is a control command. For example, a condition means a throughput whose measured value is under the lower limit value and a delay time whose measured value is over the upper limit value. An action means increasing a bandwidth by 0.5 Mbps from the current set value, raising a priority by one level, and the like.

The object flow field 701 allows only a flow that can assure specific communication quality to be selected and registered beforehand. The system manager beforehand sets other values except for measured values. The current set values are updated when the items as the bandwidth, and the like are increased/decreased.

Figure 8:
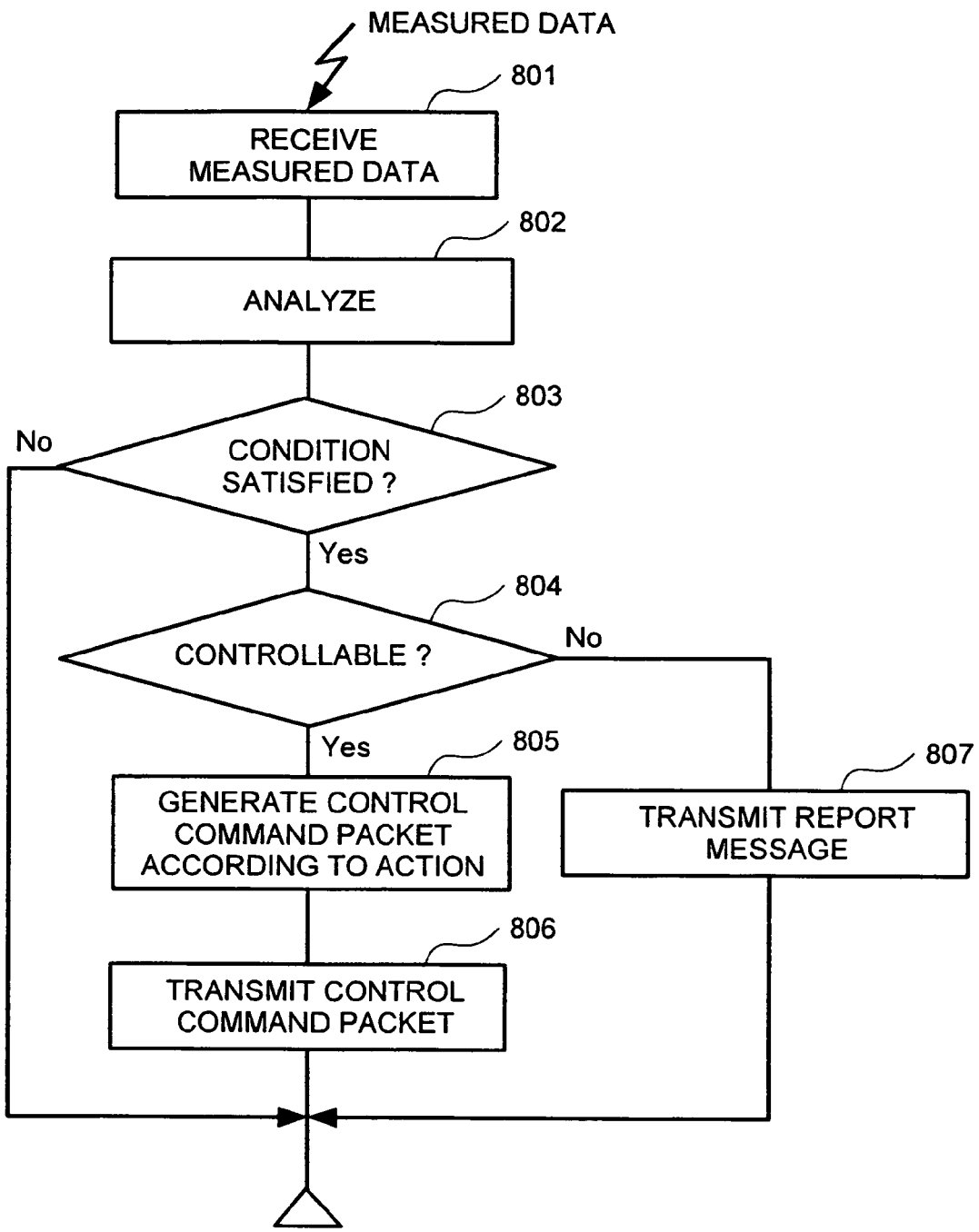
FIG. 8 illustrates a flowchart of the operation in the control server in a particular embodiment according to the present invention.

FIG. 8 illustrates a flowchart of the operation in the control server in a particular embodiment according to the present invention. This diagram is merely an illustration and should not limit the scope of the claims herein. One of ordinary skill in the art would recognize other variations, modifications, and alternatives. In a step 801, measured data can be received. Then, in a step 802, the object server analyzes the data and compares it with the upper or lower limit value of the contract. In a step 803, it is determined whether the data matches with the preset condition. If determined to match, then, in a step 804, it is determined whether it is possible to control the flow. If determined to be possible, then in a step 805, the server creates a control command packet and in a step 806, transmits the packet to the object component. If determined to be no need to change the control of the communication quality, no processing is done specially. If determined not to be possible to control, then in a step 807, the server transmits a warning message to the user. In some cases, the control is determined to be impossible although a measured result does not satisfy a user's requested value yet. For example, while the QoS is controlled according to priorities, the user's priority level cannot be raised any more, since the user's bandwidth used for the object flow is already set to the top priority, although the top priority does not reach the user's requested value yet. In addition, there is also a case that the current bandwidth cannot be widened any more.

Figure 9:
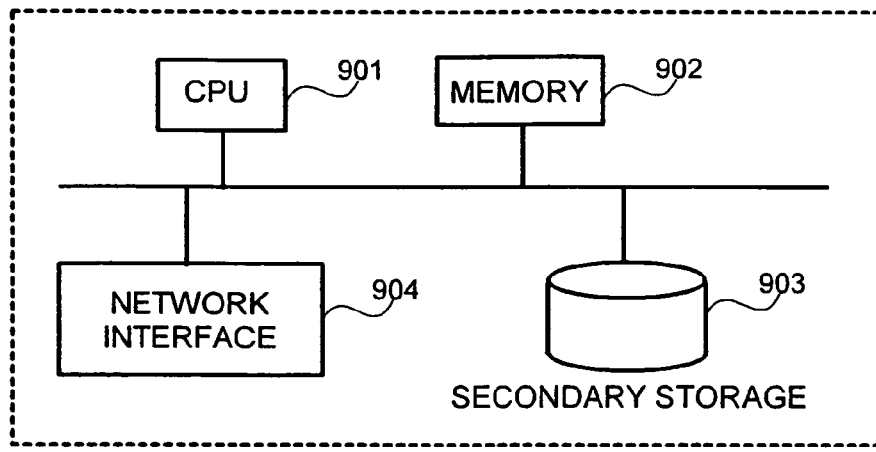
FIG. 9 illustrates a hardware block diagram of both meter and control server in a particular embodiment according to the present invention.

The control server can obtain measured data from a plurality of meters or a plurality of servers can obtain measured data from one meter. As shown in FIG. 9, both meter and controller server can comprise an information processing unit respectively. FIG. 9 illustrates a hardware block diagram of both meter and control server in a particular embodiment according to the present invention. This diagram is merely an illustration and should not limit the scope of the claims herein. One of ordinary skill in the art would recognize other variations, modifications, and alternatives. Each of them is provided with a CPU 901, a memory 902, a secondary storage 903, and a network interface 904. A program loaded from the secondary storage into the memory and executed there realizes the function of the meter or the server.

Figure 10:
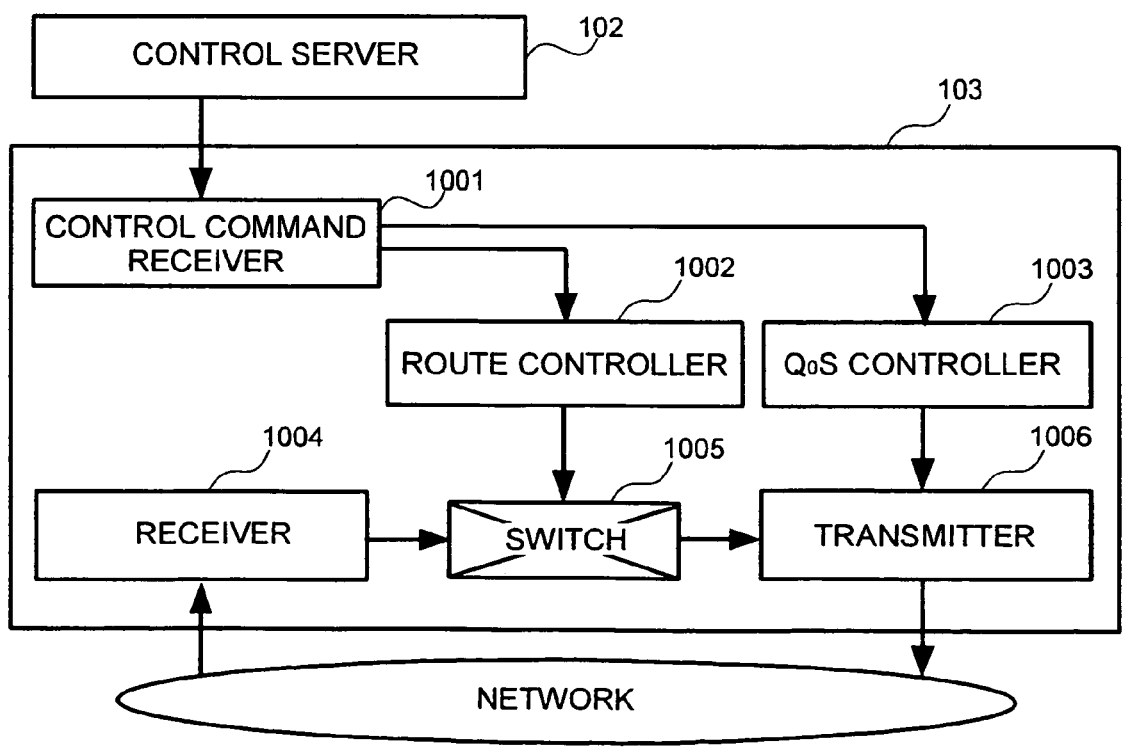
FIG. 10 illustrates a functional block diagram of a router in a particular embodiment according to the present invention.

FIG. 10 illustrates a functional block diagram of a router in a particular embodiment according to the present invention. This diagram is merely an illustration and should not limit the scope of the claims herein. One of ordinary skill in the art would recognize other variations, modifications, and alternatives. A control command receiver 1001 receives a control command from a control server and instructs a route controller 1002 or QoS controller 1003 to execute the command. Packets received by the receiver 1004 are distributed to each address in a switch 1005 in response to a delay command from the route controller 1002. The transmitter 1006 transmits those packets to each address. The QoS controller 1003 instructs both receiver and transmitter to control the QoS when in relaying. In a specific embodiment, the QoS controller 1003 specifies a queue to be allocated to each flow.

Figure 11:
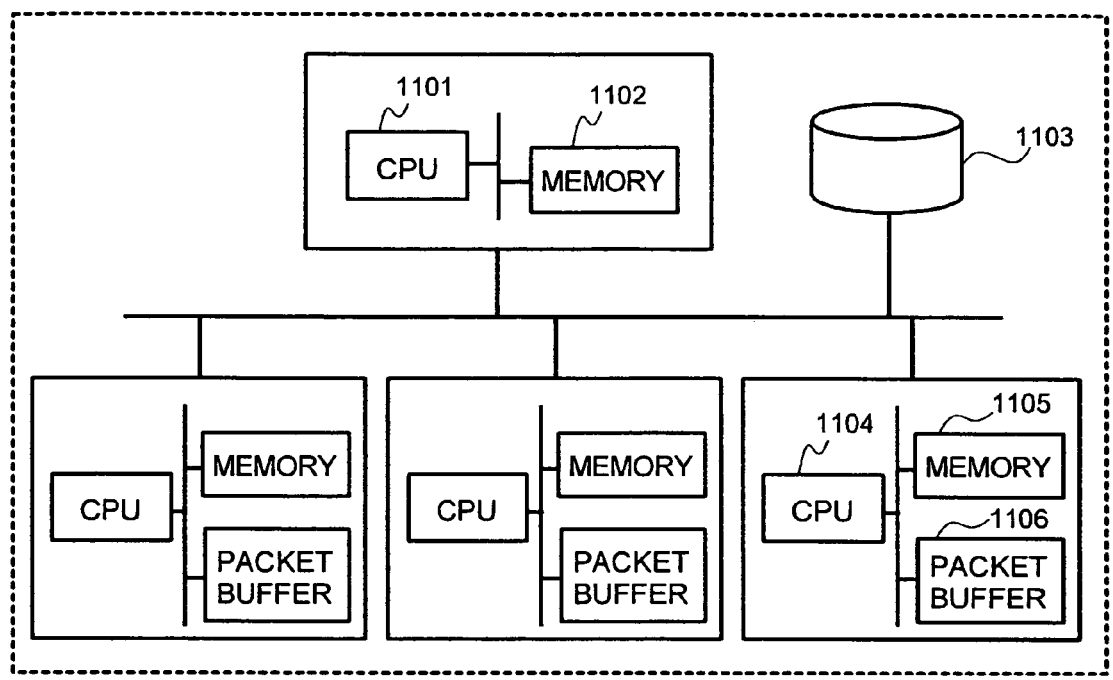
FIG. 11 illustrates a hardware block diagram of the router in a particular embodiment according to the present invention.

FIG. 11 illustrates a hardware block diagram of the router in a particular embodiment according to the present invention. This diagram is merely an illustration and should not limit the scope of the claims herein. One of ordinary skill in the art would recognize other variations, modifications, and alternatives. The router comprises a CPU 1101, a memory 1102, a secondary storage 1103, and output interfaces composed of a CPU 1104, a memory 1105, and a packet buffer 1106 respectively. In a specific embodiment, meter can be mounted so as to be adjusted to both information processing unit and router. In such embodiments, the meter functions as a process in the memory of the router. The packet receiver receives packets from the router receiver, then passes the packets to the next process after the measurement for them is finished.

Figure 12:
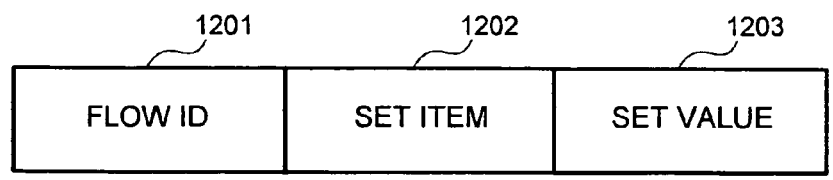
FIG. 12 illustrates a format of a control command packet in a particular embodiment according to the present invention.

FIG. 12 illustrates a format of a control command packet in a particular embodiment according to the present invention. This diagram is merely an illustration and should not limit the scope of the claims herein. One of ordinary skill in the art would recognize other variations, modifications, and alternatives. The packet command comprises fields 1201, 1202, and 1203. The field 1201 is a flow identification field for setting information, such as source address, destination address, and the like, to identify an object flow. The field 1202 is an object item field for indicating object items, such as bandwidth, priority, route, and the like, to be set for controlling communication quality. The field 1203 is a set value field for setting such conditions as a priority, a route, and the like, for the router.

Hereunder, a description will be made for an example embodiment in which communication quality can be controlled according to measured data from each meter. In a specific embodiment, values for controlling communication quality from a router are a bandwidth, a priority, and a route. Measured data types employed as conditions for the controlling are a throughput and a delay time. A control policy operates a bandwidth, a priority, and routes according to a delay time or a throughput.

Figure 13:
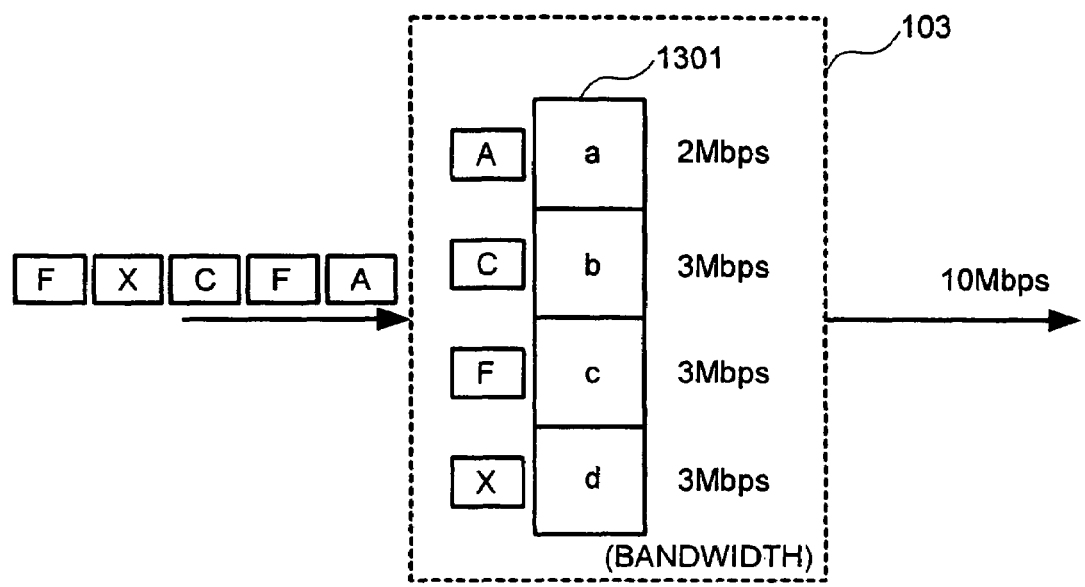
FIG. 13 illustrates a queue provided in the router in a particular embodiment according to the present invention.
Figure 13:
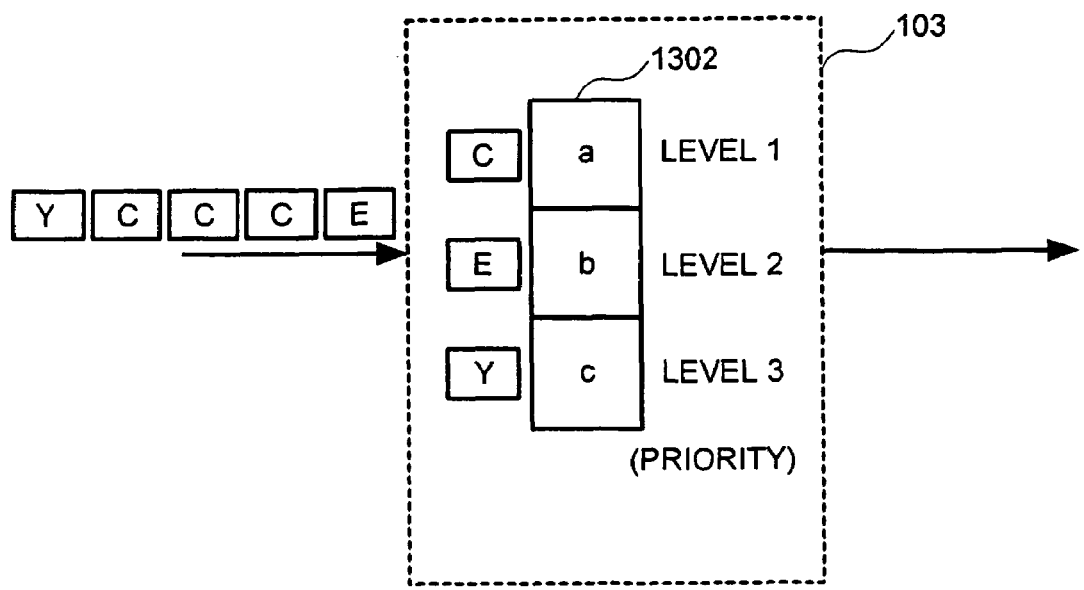

FIG. 13 illustrates a representative technique for QoS control in an output queue provided in the router in a particular embodiment according to the present. This diagram is merely an illustration and should not limit the scope of the claims herein. One of ordinary skill in the art would recognize other variations, modifications, and alternatives. FIG. 13(*a*) shows controlling by bandwidth and FIG. 13(*b*) shows controlling by priority.

The entries 711, 712, and 713 shown in FIG. 7 are used for controlling the QoS through an allocation of a bandwidth. While packets are relayed, the router shown in FIG. 13(*a*) allocates a bandwidth to an output queue 1301 connected to a network, thereby adjusting the number of output packets so as to control the bandwidth. For example, in a specific embodiment, there is a network that has a usable bandwidth of 10 Mbps and the flows of the entries 711 to 713 are defined as A, C, and F. Each flow uses queues 1301*a* to 1301*c* to which 2 Mbps, 3 Mbps, and 3 Mbps are allocated respectively. Other flows share a queue 1301*d* to which 2 Mbps is allocated. The 2 Mbps is a remaining bandwidth excluded from the QoS items.

The entry 711 has a control policy, in which it measures a delay time and increases the bandwidth (executes action A1) if the measured delay time exceeds the upper limit value (equivalent to condition C3). Further, the bandwidth is decreased (executes action A3) if the measured delay value is under the lower limit value (equivalent to condition C4).

In this example embodiment, if a measurement result matches with the preset condition, then it is determined that the action should be executed. For example, the action can be executed when the measurement result matches with the condition even once, when the measurement result matches with the condition more than once and when the measurement result continues to match the condition by a certain number of times or for a fixed time.

The entry 711 allows more bandwidth to be allocated, since a measured delay time exceeds the upper limit value. The action can comprise increasing a bandwidth value by approximately 0.5 from the current set value. The control server transmits a control command to the router 1, which is an object component. As instructed by the command, the router 1 increases the allocated bandwidth value for the object flow A. Because the bandwidth value is fixed, an expansion value of the bandwidth to the queue 1301*a* used by the flow A is subtracted from the allocated bandwidth value of the queue 1301*d* shared by non-object flows.

The entry 712 indicates a case for measuring a throughput. The entry 712 has a control policy in which the bandwidth value is increased (action A1 is executed) in accordance with a measured throughput value, which goes under the lower limit value (equivalent to condition C1). Further, the value is decreased (action A3 is executed) when the measured value is over the upper limit value. If a measured value matches with the condition, the router 1 that has received a control command operates the bandwidth for the queue 1301*b* that uses a flow C.

The entry 713 has measured data types; throughput and delay time. The entry 713 can control one flow according to a plurality of measured data. The entry 713 has a control policy that AND and OR are executed. The entry 713 executes action A1 if a measured throughput value matches with condition C1 and if a measured delay time is equivalent to condition C3. The entry 713 executes action A3 if a measured throughput value is equivalent to action C2 and if a measured delay time is equivalent to condition C4.

The entries 714 and 715 shown in FIG. 7 can provide control of QoS by priority. The router shown in FIG. 13(*b*) allocates a priority level (level 1: top priority) to the output queue 1302 connected to the object network and controls the output sequence. The flows of the entries 714 and 715 are indicated as C and E. For example, in a specific embodiment, three types of queues are used for the output to a network and the flows C and E use the queues 1302*a* and 1302*b* to which levels 1 and 2 are allocated. Other flows that share the queue 1302*c* are excluded from the QoS. Level 3 is allocated to these flows.

The entry 715 that measures a delay time has a control policy in which action A2 is executed to raise the priority if a measured value agrees to condition C3. In this embodiment, because a measured delay time is over the upper limit value, the server transmits a control command for decreasing the priority of the object flow by one (level 1) from the current value to the router 2. The router 2 changes the current queue of the flow E from 1302*b* to 1302*a*.

The policy of the entry 714 that measures a throughput is that action A2 is executed to raise a priority if a measured value agrees to condition C1. Because the current priority of the flow C is the top level 1, however, it is not feasible to raise the priority any more in this specific instance. Thus, the server can notify the user with a "control disabled" message, or the like.

If many flows have the same priority, the delay and throughput of each flow may not be satisfied within the contract of the user. To avoid this, the number of flows to be allocated to each priority can be managed so that flows are concentrated only for a higher priority if the communication is controlled according to priorities. In a specific embodiment, an upper limit is set for the number of flows allocated to each high priority. With this limit, an action for raising a high priority more is rejected even when the priority is not the top one.

The entry 716 shown in FIG. 7 is useful in embodiments wherein the communication is controlled according to routes. A route action can be executed when there is an alternative route. If a measured value agrees with condition C3 that the delay time of the current route R1 is over the upper limit value, then the control server determines the status of another route other than R1. Further, the control server can determine another route that satisfies the contract value of the user and can instruct the router to take the route.

Control techniques are provided in specific embodiments according to the present invention. Such control techniques can provide a high probability of satisfying a user contract value. If a user contract value cannot be satisfied even with any of the control techniques described above, and a subsequently measured value agrees with the preset condition, then the same control technique can be repeated.

The router can execute a control technique for each output interface as described above. Consequently, interfaces that execute different controls (controlling by bandwidth and controlling by priority) may exist in, for example, the same router, in some specific embodiments.

Figure 14:
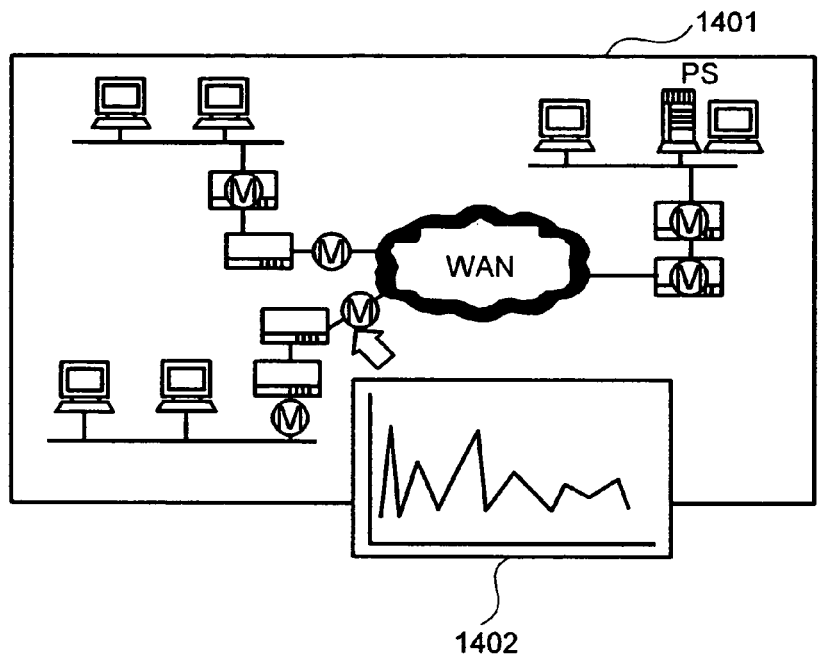
FIG. 14 illustrates a GUI in a particular embodiment according to the present invention.

FIG. 14 illustrates a GUI in a particular embodiment according to the present invention. This diagram is merely an illustration and should not limit the scope of the claims herein. One of ordinary skill in the art would recognize other variations, modifications, and alternatives. FIG. 14 shows a GUI (Graphical User Interface) useful in a specific embodiment, to provide a user, such as a network manager, for example, the capability to check the status of the object network. On a window 1401 are displayed a network configuration including the meter, the control server, and the router. If a meter is specified here, the measurement rule setting screen for the meter, as well as graphs of meter measured information, are displayed. If a server is specified, the control rule setting screen is displayed. The graph 1402 has a horizontal axis for indicating a time and a vertical axis for indicating a throughput.

Thus, embodiments according to the present invention, as described above, can provide QoS controlling techniques that can more precisely control QoS according to the status of the object network.

Next, further embodiments according to the present invention will be described. In further representative embodiments according to the present invention, a system for testing whether required communication service quality can be assured before a communication service is started is provided. Although the communication status can be measured at a midpoint of a communication service in specific embodiments, alternative embodiments enable a test packet to be transmitted and a delay time, or a throughput or other quality measurement for the test packet to be measured before a communication service is started, thereby checking the communication status. However, in order to avoid receiving of packets at an information processing terminal in the destination of the user's request, the destination of the test packet is decided to be an edge router, for example. The edge router can be in a broadcast domain where the destination of the user's request exists. The control server can check whether the condition of the requested service can be satisfied according to the test result. In addition, the control server can determine the communication condition to satisfy the requested condition. The items set to satisfy the condition are set values related to such QoS controlling items as a bandwidth, a priority, and the like, as well as a route.

Figure 15:
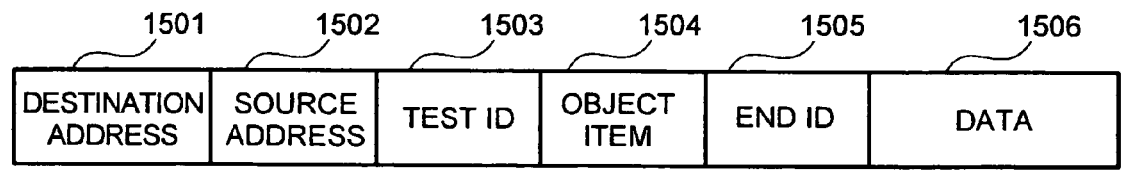
FIG. 15 illustrates a format of a test packet in a particular embodiment according to the present invention.

FIG. 15 illustrates a format of a test packet in a particular embodiment according to the present invention. This diagram is merely an illustration and should not limit the scope of the claims herein. One of ordinary skill in the art would recognize other variations, modifications, and alternatives. The format comprises fields 1501, 1502, 1503, 1504, 1505, and a data part 1506. The field 1501 is a destination address field for setting a destination address of a user request. The field 1502 indicates a source address. The field 1503 is a test ID field for setting a test number given uniquely in an object control server. The field 1504 is a measurement object field for setting a measurement object. The field 1505 is an end point ID field for setting an end point meter ID. Any value can be set in the data part 1506 in bytes. The control server can instruct the test transmitter 606 or the meter to transmit a test packet.

Figure 16:
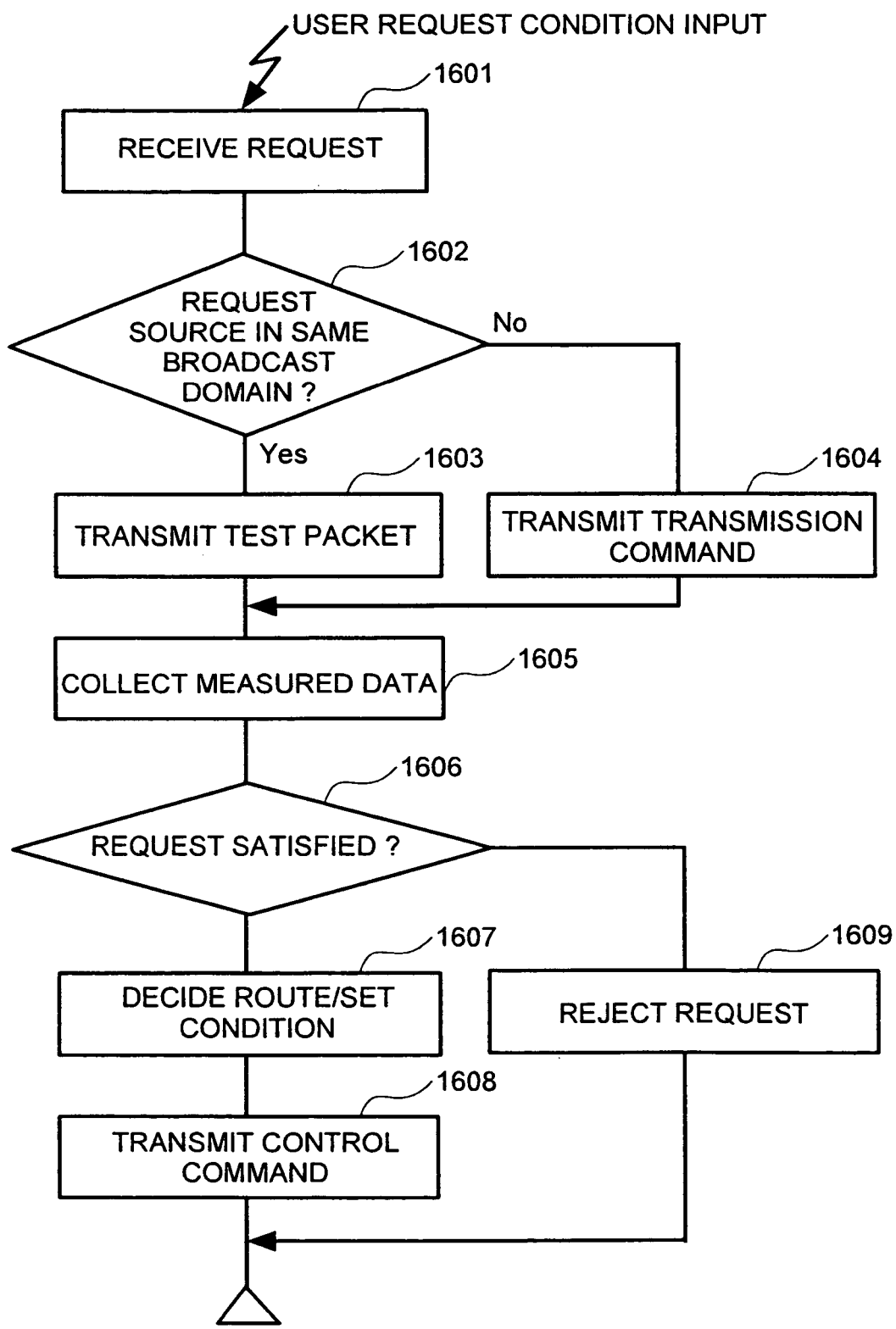
FIG. 16 illustrates a flowchart of the operation in the control server in a particular embodiment according to the present invention.

FIG. 16 illustrates a flowchart of the operation in the control server in a particular embodiment according to the present invention. This diagram is merely an illustration and should not limit the scope of the claims herein. One of ordinary skill in the art would recognize other variations, modifications, and alternatives. The user, when using a communication service, transmits both communication service request and necessary communication quality to the control server from an information processing terminal. Instead of transmission of the requirements, the user may register the contracted communication service contents from the GUI of the control server. FIG. 16 illustrates a step 1601 of receiving a communication service request from a user. Then, in a step 1602, the control server determines whether the requested source information processing terminal belongs to the same broadcast domain, i.e., a range partitioned by a router, as that of the control server itself. If it belongs to the same broadcast domain, then in a step 1603, the server generates a test packet and transmits the packet to the object network. A plurality of test packets comprised of substantially similar content may be transmitted to the network at this time.

If the request source information processing terminal is not in the same domain, then, in a step 1604, the control server can instruct a meter in the same broadcast domain as that of the request source information terminal so as to transmit a test packet. If there is no such meter, the control server can instruct the meter closest to the requested source information terminal to transmit the test packet.

In a step 1605, the control server can collect measured data for the test packet. Then, in a step 1606, the server determines whether the measured data satisfies the user's request. If it satisfies the user's request, then in a step 1607, the server determines both route and QoS condition according to the measured data. In a step 1608, the server can instruct the router to control the communication so as to assure the requested communication quality and can instruct a meter to measure the communication data. If the measured data does not satisfy the user's request, then in a step 1609, the server rejects the request. Instructed to transmit a test packet by the control server, the meter generates a test packet in the test packet transmitter 210 and transmits the packet to the object network.

Upon receiving a packet, the measuring unit 202 determines if it is a test packet with reference to the test ID field 1503 of the packet header. If it is determined to be a test packet, the measuring unit 202 measures the data according to the test ID and the set data in the object field 1504. Then, the measuring unit determines whether the meter ID in the end point field 1505 of the header agrees with its own ID. If they agree, the measuring unit 202 discards the received test packet. If a meter does not have a packet transmitter, determining whether to discard by the end point field and the discarding processing are optional and can be omitted. If it is determined not to be a test packet, the measuring unit 202 measures according to the measurement rule. Measured data is then transferred to the control server as discussed above. Both test measurement and normal measurement can be substantially identical. In a specific embodiment, one difference between them is that a test measurement omits a determination for whether the test packet agrees with the object flow conforming to the measurement rule.

As described above, therefore, select specific embodiments can provide the capability to check whether each user request for a communication service is satisfied before the requested service is started. Next, yet further embodiments according to the present invention will be described. In a yet further embodiment, a meter control system that uses measured data is provided.

In a representative embodiment according to the present invention, each control server holds a meter-related policy in the control rule table. For example, if measured data in a meter exceeds the upper limit value, the control server reduces the number of measurement flows. If measured data agrees to the policy condition as a result of collection and analysis of measured data, the control server can permit the control command transmitter to transmit a control command. The control command packet in a specific embodiment comprises a format as illustrated in FIG. 12 and can be substantially similar to the format of a command transmitted to the router. In a specific embodiment, such measurement items as the number of bytes, a throughput, and the like, in the flow type field are set as conditions for identifying an object flow. For example, if measured data in a meter exceeds the upper limit value, the control server reduces the number of measurement flows. There are several techniques for reducing the number of measurement flows. In one of them, measurement flows in the control rule table can be deleted sequentially from bottom to top.

A measurement may also be done in a plurality of meters in a dispersed manner. For example, a control server can check measured data in each of the meters managed by it. If measured data is increased excessively in meter 1, the server disperses the processing in other meters so that flow 1 is processed in meter 1, flow 2 is processed in meter 2, and so forth. Consequently, specific embodiments can provide the capability to make a measurement in accordance with the status of the traffic flow of the object network, in order to prevent the meters from overloading.

Next, still yet further embodiments will be described. In a representative embodiment according to the present invention, obtaining an arrival time of each packet in a flow from two or more meters, and thereby calculating a delay time of the object network can be provided.

Figure 17:
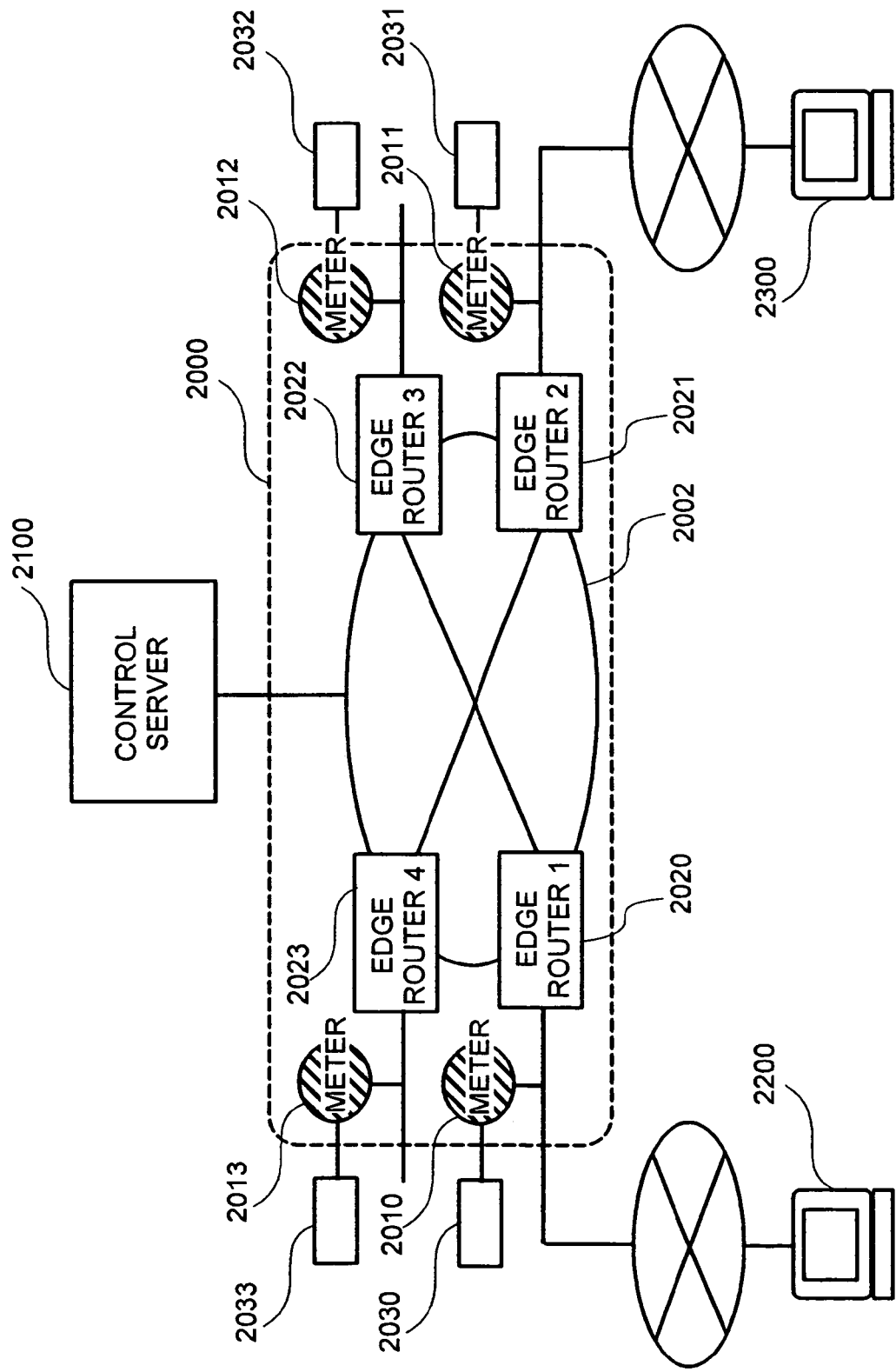
FIG. 17 illustrates a block diagram of a network system in a particular embodiment according to the present invention.

FIG. 17 illustrates a block diagram of a network system in a particular embodiment according to the present invention. This diagram is merely an illustration and should not limit the scope of the claims herein. One of ordinary skill in the art would recognize other variations, modifications, and alternatives. FIG. 17 is a block diagram of a network system comprising a control server 2100, edge routers 2020 to 2023 and meters 2010 to 2013 connected to a network 2002. The server 2100 manages and controls various components of the network.

Each meter is connected to a wireless communication unit 2030 to 2033 for obtaining accurate time information. The network system may also obtain this time information from another time server through the network 2000. In a specific embodiment, techniques for measuring a packet delay generated between information processing terminals 2200 and 2300 within a range 2000 managed by the control server 2100 are provided.

FIG. 18 illustrates a functional block diagram of a control server in a particular embodiment according to the present invention. This diagram is merely an illustration and should not limit the scope of the claims herein. One of ordinary skill in the art would recognize other variations, modifications, and alternatives. The control server hardware configuration can be substantially similar to that of the server shown in FIG. 9, for example. FIG. 18 illustrates a functional block diagram having a meter setup AP 2102, which is an application program for writing/reading necessary information in/from a meter controlling rule table 2108. Controlling rule table 2108 describes rules for controlling meters and a meter disposition table 2116 describes how meters are disposed in the object network.

FIG. 18 further illustrates a meter monitor 2104, which can be an application program for monitoring the present state of the object network. A policy setup input AP 2106 is an application program for writing/reading router controlling rules in/from a router controlling rule table 2114. A meter control command transmitter 2118 transmits messages for controlling each meter and obtains data measured by the meter via a measured data acquisition unit 2120. A router control command transmitter 2122 transmits control messages to each router. A data analyzer 2112 issues control commands to the router control command transmitter 2122 with reference to both information obtained from the measured data acquisition unit 2120 and the contents of the router control rules table 2114. Further, data analyzer 2112 transmits information obtained from the measured data acquisition unit 2120 to the user interface unit 2107 or the meter setup unit 2110 for setting up controlling of each meter. A meter setup unit 2110 issues a control command to the meter control command transmitter 2118 with reference to the information in both the meter control rule table 2108 and the meter disposition information table 2116.

FIG. 19 illustrates representative contents of a meter disposition information table in a particular embodiment according to the present invention. This diagram is merely an illustration and should not limit the scope of the claims herein. One of ordinary skill in the art would recognize other variations, modifications, and alternatives. FIG. 19 illustrates a meter disposition information table 2116. Information table 2116 comprises a host address 21160, which indicates the host address of an information processing terminal, and a meter ID 21162, which indicates an identification number of a meter disposed between the information processing terminal and an edge router of network 2000. These information items are set with use of the meter setup application program AP 2102 or the control server may set those information items automatically with reference to the routing table of the router.

FIG. 20 shows the contents of a representative meter control rule table in a particular embodiment according to the present invention. This diagram is merely an illustration and should not limit the scope of the claims herein. One of ordinary skill in the art would recognize other variations, modifications, and alternatives. FIG. 20 shows the contents of the meter control rule table 2108. A meter ID field 21080 comprises an identification number of a meter. An object flow field 21081 comprises two host addresses and a flow orientation. For example, "aaa bbb" means that packets flowing from a host aaa to another host bbb are detected. The "*" means "all hosts".

The data type field 21082 specifies characteristics, delay, throughput, and the like, of a flow to be measured by a meter. The arrival/departure field 21083 comprises a parameter for specifying whether the object meter measures the start of a flow or the end of the flow. A measurement interval field 21084 comprises intervals in seconds at which the object meter measures a flow of packets. A value of "0" indicates that every packet is measured. In a reference time field 21085, a basic time for starting a measurement is entered. This time can be referenced to measure a flow of packets. A basic delay time field 21087 can be set to a value related to a meter for which "delay" is set in the data type field 21082 and "arrival" set in the arrival/departure field 21083. This value is an average delay time and its average error range of the transfer from a "departure" meter to an "arrival" meter. In the measuring time field 21086, a measuring time calculated on the basis of the reference time for measurement 21085 and the measuring interval 21084 can be entered. In the A/N field 21088, an indication whether the object rule is employed can be entered. A value of "A" means that the object rule is employed and a value of "N" means that an object rule is not employed.

FIG. 21 illustrates the contents of a representative measurement rule table in a particular embodiment according to the present invention. This diagram is merely an illustration and should not limit the scope of the claims herein. One of ordinary skill in the art would recognize other variations, modifications, and alternatives. FIG. 21 shows the contents of the measurement rule table 207 included in the functional block diagram of a meter shown in FIG. 2. The contents in this table are extracted from the meter control rule table 2108 in relation to each meter. The meter control command transmitter 2118 shown in FIG. 18 transmits the data in this table. A rule number field 21700 comprises the rule of each meter.

FIG. 22 illustrates the contents of a representative measured data table in a particular embodiment according to the present invention. This diagram is merely an illustration and should not limit the scope of the claims herein. One of ordinary skill in the art would recognize other variations, modifications, and alternatives. FIG. 22 shows the contents of the measured data table 208 included in the functional block diagram of a meter shown in FIG. 2. The rule number 21801 indicates a rule number 21700 shown in FIG. 21, for example. The stored data format 21802 indicates a format of stored data. The "throughput" indicates a total length of packets received per unit time. The "header" indicates that the header of each packet is described. The "header+8 bytes" indicates that the header of each packet and the first 8 bytes in the data part are to be stored. The measurement result start address 21803 indicates the start address of the above stored data. The data quantity 21804 indicates the number of stored data items.

Figure 23:
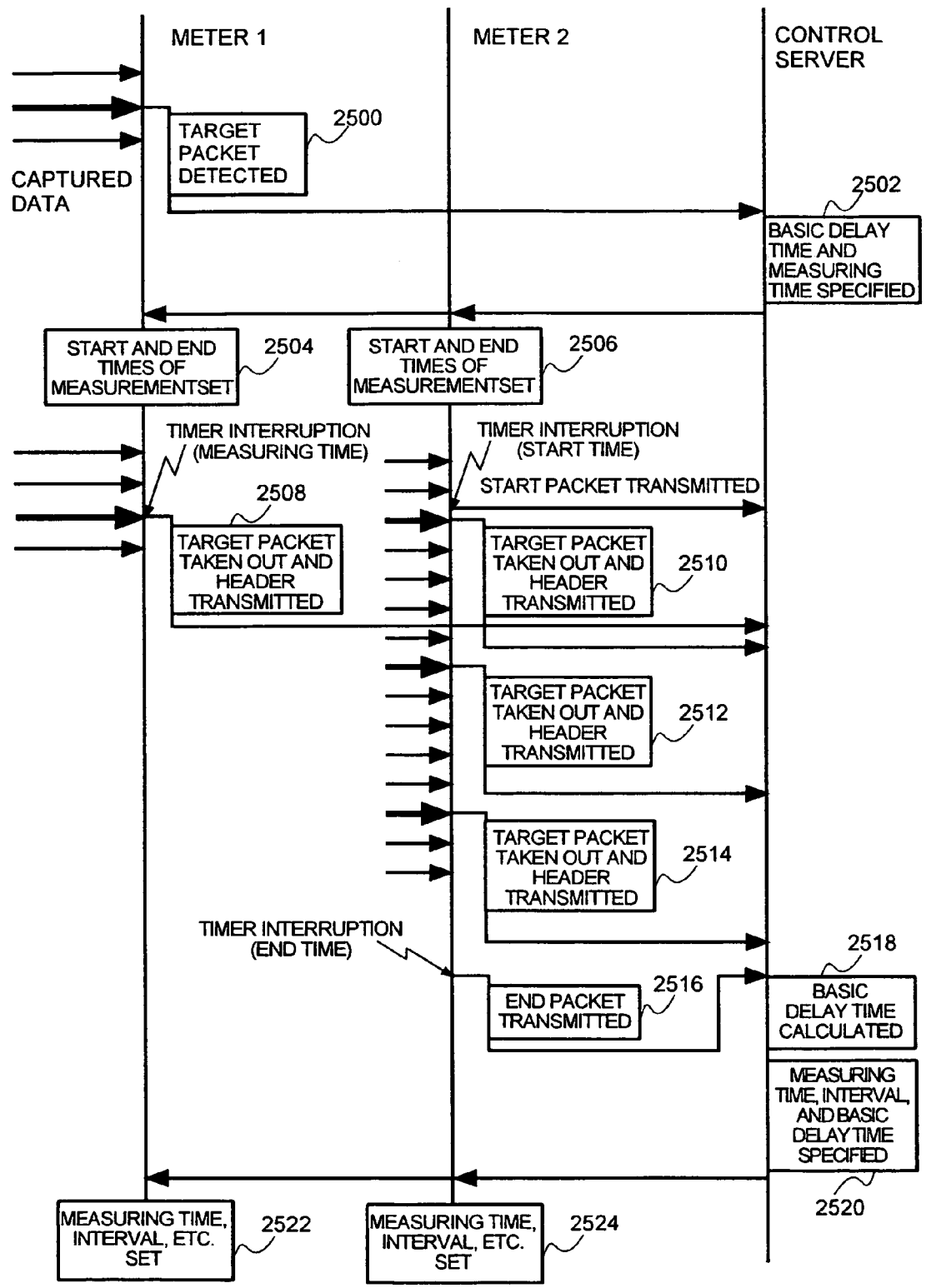
FIG. 23 shows a sequence for measuring a transfer delay time among a plurality of meters in a particular embodiment according to the present invention.
Figure 23:
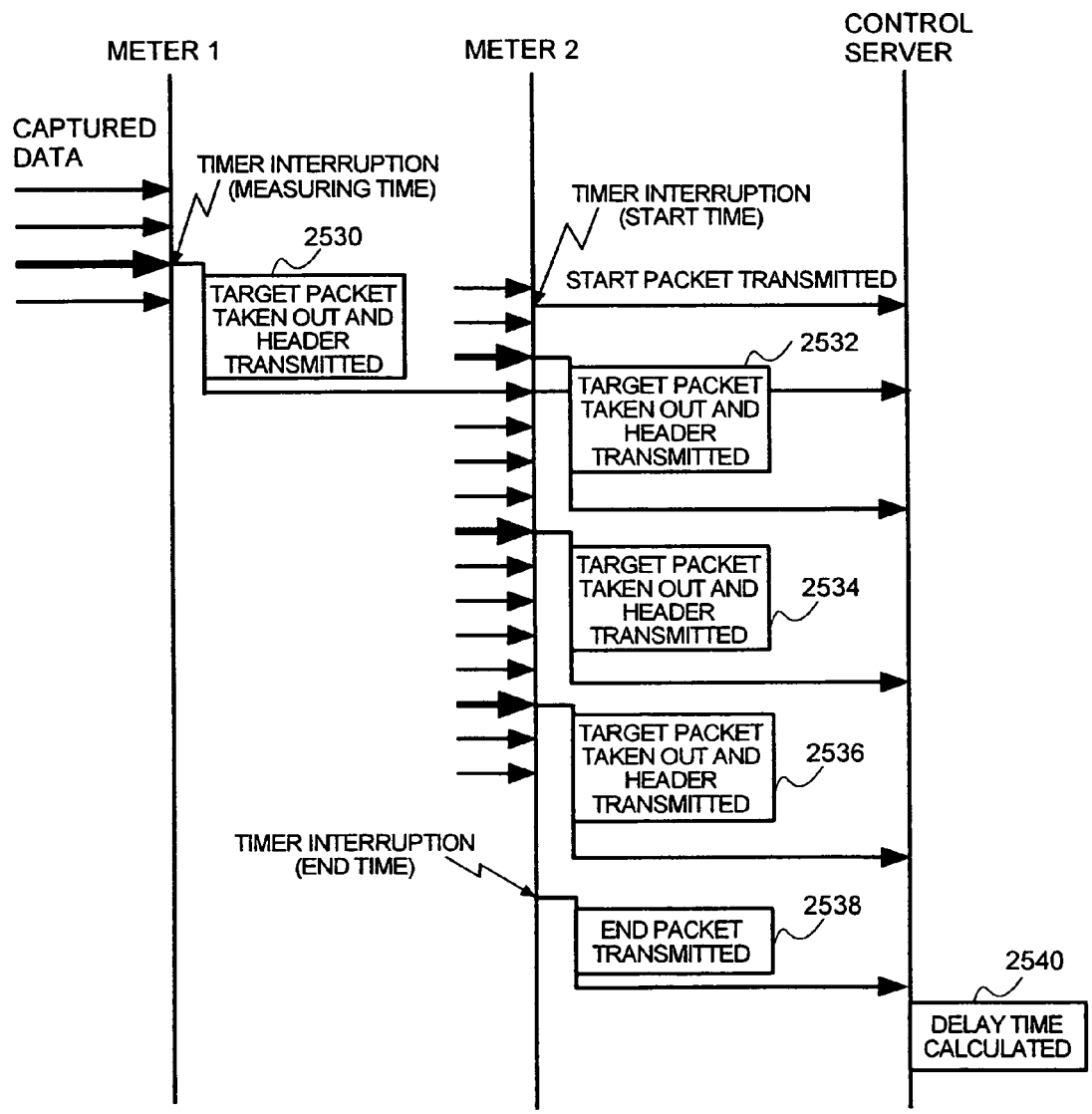
Figure 23:
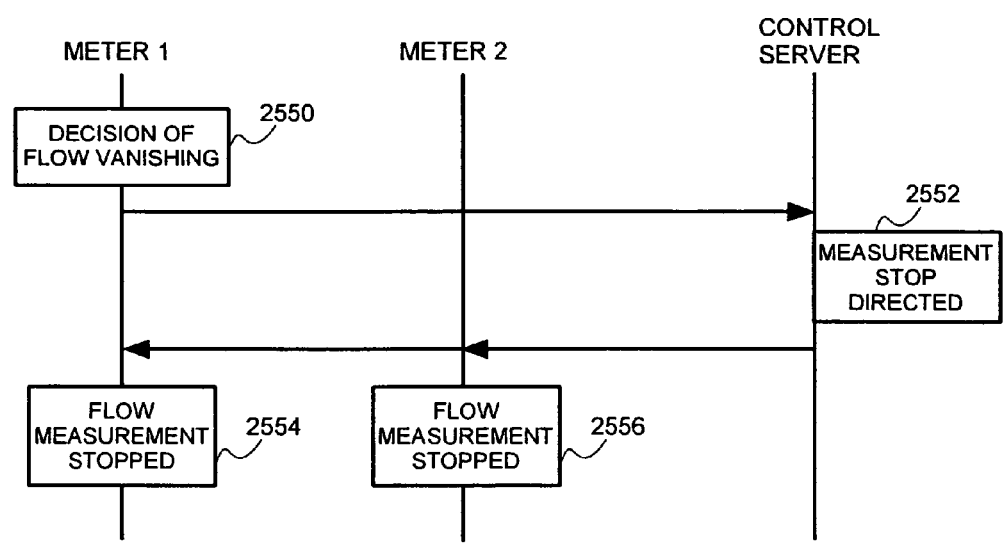

FIG. 23 illustrates a representative sequence for measuring a transfer delay time among a plurality of meters in a particular embodiment according to the present invention. This diagram is merely an illustration and should not limit the scope of the claims herein. One of ordinary skill in the art would recognize other variations, modifications, and alternatives. FIG. 23 shows a sequence for measuring a transfer delay time between meters 2010 and 2011, shown in FIG. 17, in a specific embodiment.

Meters 2010 and 2011 repeatedly detect packets flowing in the object network. If the meter 2010 detects a packet described in the measurement rule table 207, then meter 2010 transmits a message to notify the control server 2100 that a flow described in the measurement rule table 207 is started, as indicated by 2500 of FIG. 23. The "departure" side meter detects such a flow of packets. In this flow, the meter 2010 becomes the "departure" side meter and the meter 2011 becomes the "arrival" side meter. Thereupon, the control server 2100 selects a meter related to this flow via the meter setup unit 2110. Control server 2100 instructs the meter control command transmitter 2118 in FIG. 18 as shown by 2502 of FIG. 23 to send both start time and end time of the measurement to the meters 2010 and 2011 so as to start measurement of a basic delay time.

The meter 2010 then sets the start time 2504 and stores the packets of the first flow detected after the start time notified by a timer interruption. The meter adds the packet receiving time to the packet and transfers it to the control server 2508. If the meter 2010 cannot detect the packets until the measurement end time is over, the meter 2010 so notifies the control server 2100. The control server sets "N" in the A/N field 21088 in the meter control rule table 2108 and excludes the flow from the application range of the rule.

Setting both start time and end time of a measurement 2506, the meter 2011 stores the packets of the object flow detected between the start time and the end time notified by a timer interruption respectively. Then, meter 2011 adds the receiving time to each of the packets and transfers the flow to the control server, as indicated by 2510, 2512 and 2514 of FIG. 23(a). The meter 2011 transmits an end packet to the control server at the end time 2516.

The control server 2100 compares each packet transferred from the meter 2010 with a plurality of packets transferred from the meter 2011. The control server 2100 finds the packets agreeing with each other in content and calculates a difference between the receiving times added to those packets, thereby obtaining a basic delay time of each packet flow 2518. In addition, the control server specifies the reference time, the time interval and the basic delay time used by the meter according to this basic delay time 2520. For example, if "Dec. 24, 15:00:00, 1999" is set as the reference time, 180 seconds is set for the time interval, 10 seconds is set for the measuring time for both meters 2010 and 2011. Then the basic delay time is calculated as 750(ms)±50(ms) from the above set values.

If the above values are set for the two meters 2522 and 2524, each of those meters will make measurement under the following conditions.

For "departure" side meter 2010:
Reference time for measurement: Dec. 24, 15:00:00, 1999
Time interval for measurement: 180 sec
Measuring time: 10 sec after scheduled start time
For "arrival" side meter 2011:
Reference time for measurement: Dec. 24, 15:00:00, 1999
Time interval for measurement: 180 sec
Measuring time: Between scheduled start time+(750−50) ms and scheduled start time+10 sec+(750+50) ms As described above, the measurement time of the "arrival" side meter differs from that of the "departure" side meter. This is because to find the packets agreeing to each other in content at a high probability through a comparison for a plurality of packets transferred from two meters, and to utilize the measuring time efficiently, by affecting a basic measured delay time on the object measuring time so that the load of each meter is reduced.

FIG. 23(b) shows a sequence for actually measuring a delay time. The meter 2010 stores packets of the first detected flow after the measurement start time notified by a timer interruption, adds the packet receiving time to each packet in the flow, and transfers the flow to the control server 2530.

The meter 2011 stores packets from the object flow detected between the start time and the end time of measurement notified by a timer interrupt respectively. Then, meter 2011 adds the packet receiving time to each of the packets in the flow, and transfers the flow to the control server 2532, 2534 and 2536. In addition, the meter 2011 transmits an end packet to the control server 2538 at the end time.

The control server 2100 compares each packet transferred from the meter 2010 with a plurality of packets transferred from the meter 2011. Thereupon, control server 2100 finds the packets agreeing with each other in content, and calculates a difference among the receiving times added to those packets so as to obtain a delay time of the flow 2540. The control server 2100 uses this delay time to compensate the basic delay time.

If no further packets are detected in a flow after a predetermined number of continuous measurement times, the meter 2010 determines that the flow is vanishing and so notifies the control server 2100, as illustrated by 2550. The control server then sets "N" in the A/N field 21088 for the object meter rule in the meter control rule table 2108 shown in FIG. 20. Thereupon, the control server instructs the meter to stop the measurement 2552. Upon receiving this instruction, the meter stops the flow measurement 2554 and 2556.

Figure 24:
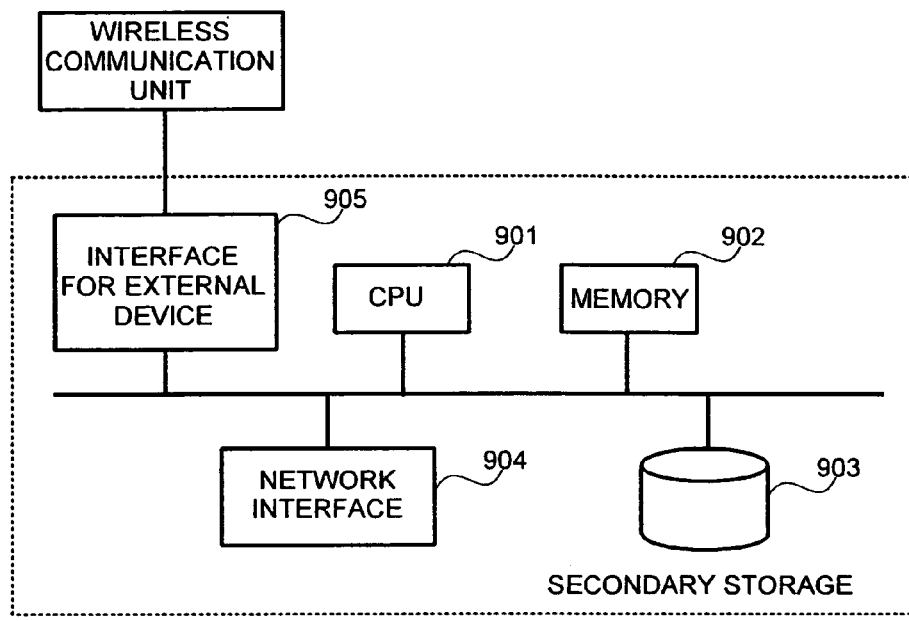
FIG. 24 illustrates a hardware block diagram of a meter in a particular embodiment according to the present invention.

FIG. 24 illustrates a hardware block diagram of a representative meter in a particular embodiment according to the present invention. This diagram is merely an illustration and should not limit the scope of the claims herein. One of ordinary skill in the art would recognize other variations, modifications, and alternatives. FIG. 24 illustrates a meter having an interface 905 for connecting an external device. The meter can obtain time information from a wireless communication unit for obtaining time information through this interface.

Figure 25:
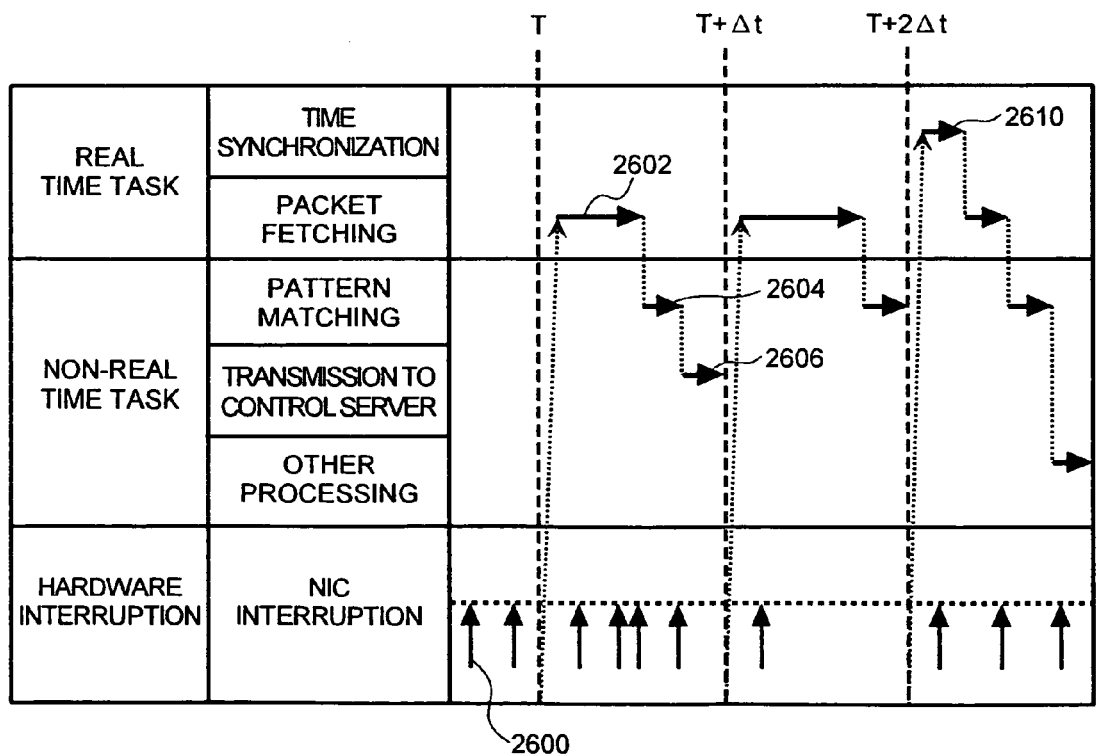
FIG. 25 illustrates a representative task schedule for a meter in a particular embodiment according to the present invention.

FIG. 25 illustrates a representative task schedule for a meter in a particular embodiment according to the present invention. This diagram is merely an illustration and should not limit the scope of the claims herein. One of ordinary skill in the art would recognize other variations, modifications, and alternatives. The operating system (OS) of the meter is preferably realized as a real time operating system, having the following capabilities: (1) the meter manufacturer can set and control both priority and schedule of real time tasks; and (2) the hardware interruption can be locked temporarily and this interruption information can be passed to a task at any time.

The meter is preferably connected to a unit for receiving wireless communication information that supplies a highly accurate time. The meter can obtain an accurate time from this wireless communication unit. The network interface 904 illustrated in FIG. 24 generates hardware interrupts as a result of continuously receiving of flows of packets from the object network 2600. Each such interrupt is locked by the real time OS for a fixed time (t). When this fixed locking time has elapsed, a task 2602 of the packet receiver 201 in FIG. 2 is activated, and the locked interruption is passed to the task. Consequently, the packet receiver 201 executes the packet fetching processing at the top priority. The real time OS, confirming the end of this processing, activates another general task 2604 and 2606 according to the normal task scheduling. The real time OS then activates a time synchronization task 2610, reading time from the wireless communication unit at a fixed interval larger than the t, thereby obtaining an accurate time.

In specific embodiments employing the above described techniques, the meter can obtain a packet arrival time accurately at fixed (t) intervals.

CONCLUSION

Although the above has generally described the present invention according to specific systems, the present invention has a much broader range of applicability. In particular, while foregoing has described a specific embodiment having a meter, the techniques according to the present invention can be readily embodied in computer software, systems and methods.

The specific embodiments described herein are intended to be merely illustrative and not limiting of the many embodiments, variations, modifications, and alternatives achievable by one of ordinary skill in the art. Thus, it is intended that the foregoing description be given the broadest possible construction and be limited only by the following claims.

The preceding has been a description of the preferred embodiment of the invention. It will be appreciated that deviations and modifications can be made without departing from the scope of the invention, which is defined by the appended claims.

What is claimed is:

1. A network measurement controlling method operable in a control server connectable to a network having at least two meters that receive packets from the network and transfer at least some of those packets, the method comprising:
   storing a threshold that requires quality controlling for each measurement flow and an action to be carried out if said threshold is exceeded; and
   receiving a measurement result from one meter,
   receiving a measurement result from another meter;
   comparing said measurement results with said threshold, and
   instructing a router to carry out said action for controlling a communication quality according to said measurement result in accordance with rules administered by the control server.

2. A method for enforcing a quality of service in at least one of a plurality of flows in a network having at least two meters that receive packets and transfer at least some of those packets, the method comprising:
   receiving information indicating a desired quality of service;
   dynamically monitoring said network at a first meter for packets in said at least one of a plurality of flows to determine a measured quality of service;
   dynamically monitoring said network at a second meter for packets in at least one of the plurality of flows to determine a measured quality of service;
   comparing said measured qualities of service to said information indicating a desired quality of service; and thereupon dynamically reallocating network resources to manage said at least one of a plurality of flows to maintain said desired quality of service.

3. The method of claim 2, wherein said measured quality of service is a parameter selected from: a number of packets, a number of bytes, a throughput, a maximum amount of data to transfer per unit time, a delay time, a packet loss, a jitter, and a maximum data amount to transfer.

4. A computer program product for enforcing a quality of service in at least one of a plurality of flows in a network, the network including at least two meters which receive packets and transfer at least some of those packets, the computer program product comprising:
- code for receiving information indicating a desired quality of service;
- code for dynamically monitoring said network at a first point with a first meter for packets in said at least one of a plurality of flows to determine a first measured quality of service;
- code for dynamically monitoring said network at a second point with a second meter for packets in said at least one of a plurality of flows to determine a second measured quality of service;
- code for comparing said measured qualities of service to said information indicating the desired quality of service;
- code for dynamically reallocating network resources to manage said at least one of a plurality of flows to maintain said desired quality of service; and
- a computer readable storage medium for storing the code for receiving, the code for comparing and the code for dynamically reallocating.

5. A control system for a network comprising:
- at least two meters connected to the network, each of which receives packets from the network and measures a flow of the packets according to a preset measuring rule to thereby provide a measurement result;
- a control server connected to the network to receive the measurement result and output information for controlling communication quality; and
- a router connected to the network to control the communication quality according to the information from the control server;
- wherein the control server includes:
  - a storage device that contains a threshold for controlling a communication quality measurement regarding each flow from a certain source address measured by one meter to a certain destination address measured by another meter, at least one of a plurality of data types and an action to be carried out if the threshold is exceeded;
  - an analyzer that compares the measurement results from the meters with the threshold, and
  - a control command transmitter that instructs the router to carry out the action for controlling the communication quality according to the measurement results.

6. The control system as in claim 5 wherein the control server monitors a measurement load of the meter and transmits a measurement change command to the meter if an overload is detected.

7. The control system as in claim 5 wherein the control server stores an upper limit value to be measured by the meter and reduces the number of flows to be measured if the upper limit value is reached.

8. In a control system for a network having at least two meters connected to the network each to receive packets from the network and measure a flow of the packets to thereby provide a measurement result, and a router connected to the network to control communication quality according to information from a control server connected to the network to receive the measurement result and output information for controlling communication quality, the control server comprising:
- a storage device that contains a threshold for controlling a communication quality measurement for each flow from a certain source address measured by a first meter to a certain destination address measured by a second meter, at least one of a plurality of data types and an action to be carried out if the threshold is exceeded;
- an analyzer that compares the measurement results from the meters with the threshold, and
- a control command transmitter that instructs the router to carry out the action for controlling the communication quality according to the measurement results.

9. A control server as in claim 8 comprising:
- a storage device that stores a measured value of delay for a measurement flow, an upper limit value and a lower limit value for said measured value of delay; and
- wherein the control server instructs a router to widen a bandwidth if said measured value of delay exceeds said upper limit value, and said control server instructs said router to narrow said bandwidth if said measured value of delay drops below said lower limit value.

10. A server as in claim 8 comprising:
- a storage device that stores a measured value of throughput for a measurement flow, an upper limit value and a lower limit value for said measured value of throughput; and
- a control server that instructs a router to narrow a bandwidth if said measured value of throughput exceeds said upper limit value, and said control server instructs said router to widen said bandwidth if said measured value of throughput drops below said lower limit value.

11. A server as in claim 8 comprising:
- a storage device that stores a measured value of delay for a measurement flow, an upper limit value and a lower limit value for said measured value of delay; and
- a control server that instructs a router to raise a priority if said measured value of delay exceeds said upper limit value, and said control server instructs said router to lower said priority if said measured value of delay drops below said lower limit value.

12. A server as in claim 8 comprising:
- a storage device that stores a measured value of throughput for a measurement flow, an upper limit value and a lower limit value for said measured value of throughput; and
- a control server for instructing a router to lower a priority if said measured value of throughput exceeds said upper limit value, and said control server instructs said router to raise said priority if said measured value of throughput drops below said lower limit value.

13. A server as in claim 8 comprising:
- a storage device that stores a measured value of delay for a measurement flow, an upper limit value and a lower limit value for said measured value of delay; and
- a control server that outputs a command for switching to an alternative path if said measured value of delay exceeds said upper limit value.

14. A network measurement control system comprising:
- at least two meters that receive packets from a network and transfer at least some of those packets with time received information assigned to them;

a control server coupled to the network which receives packets provided with the time received information from the at least two meters, compares contents of those packets, and thereby confirms identification of each of the packets to measure a time delay for the packets to pass through the network; and using the control server coupled to the network, instructs a router coupled to the network to carry out control of communication quality according to the time delay;

wherein the network measurement control system continuously monitors the network, detects a newly generated flow of packets, transmits the flow information to the control server, and starts a measurement when the server instructs the meter that can detect the flow of packets to start the measurement, and wherein the system continuously monitors the network, detects a newly vanished flow of packets, transmits the flow information to the control server, and ends the measurement when the server that has received the vanished flow information and instructs a meter that has detected the newly vanished flow of packets to stop processing.

15. The network measurement controlling system according to claim 14 wherein the system, when measuring another delay time of the network on the basis of a measured network delay time, notifies the control server of both measurement start time and measurement end time according to the delay time.

16. The meter employed in the network measurement control system according to claim 14 wherein the meter intercepts a hardware interrupt to retrieve packets from network hardware and thereby obtain an accurate arrival time of each retrieved packet, except during a minimum unit of time for which measuring time accuracy is required.

17. A network measurement control system comprising:
at least two meters that receive packets from a network and transfer at least some of those packets with time received information assigned to them;
a control server coupled to the network and to the at least two meters, which control server receives packets provided with the time received information, compares contents of those packets, and thereby confirms identification of each of the packets to determine a time delay for the packets to pass through the network; and
wherein the control server instructs a router coupled to the network to implement control of communication quality according to the time delay;
wherein the network measurement control system continuously monitors the network, detects a newly generated flow of packets, transmits the flow information to the control server, and starts a measurement when the control server indicates at least one of the meters can detect the flow of packets to start the measurement; and
wherein the network measurement control system continuously monitors the network, detects a recently vanished flow of packets, transmits the flow information to the control server, and ends the measurement when the control server that has received the vanished flow information, instructs the meter that has detected the newly vanished flow of packets to stop processing.

18. A network measurement control system according to claim 17, wherein the network measurement control system, when measuring another delay time of said network on the basis of a measured network delay time, notifies the control server of both measurement start time and measurement end time according to said delay time.

19. A meter employed in said network measurement control system according to claim 17, wherein said meter intercepts a hardware interrupt in order to retrieve packets from network hardware to obtain an arrival time of each retrieved packet except during a minimum unit of time for which a measuring time accuracy is required, thereby obtaining an accurate arrival time of each packet.

20. A method for enforcing a quality of service in at least one of a plurality of flows in a network, the network having at least two meters which receive packets from the network and transfer at least some of those packets, the method comprising:
receiving information regarding the quality of service desired;
dynamically monitoring the network at a first location with a first meter for packets in the at least one of the plurality of flows;
dynamically monitoring the network at a second location with a second meter for packets in the at least one of the plurality of flows;
computing, based upon information from monitoring the network at the first location and the second location, a measured value of quality of service;
comparing the measured value of the quality of service with the quality of service desired; and
thereupon dynamically reallocating network resources to manage the at least one of the plurality of flows to maintain the desired quality of service.

21. A computer program product for enforcing a quality of service in at least one of a plurality of flows in a network, the network having at least two meters which receive packets from the network and transfer at least some of those packets, the computer program product comprising:
code for receiving information regarding the quality of service desired;
code for dynamically monitoring the network at a first location with a first meter for packets in the at least one of the plurality of flows;
code for dynamically monitoring the network at a second location with a second meter for packets in the at least one of the plurality of flows;
code for computing, based upon information from monitoring the network at the first location and second location, measured values of quality of service;
code for comparing the measured values of quality of service with the information indicating a desired quality of service; and
thereupon dynamically reallocating network resources to manage the at least one of a plurality of flows to maintain the desired quality of service.

* * * * *